United States Patent
Suzuki et al.

(10) Patent No.: US 7,286,737 B2
(45) Date of Patent: Oct. 23, 2007

(54) OPTICAL FIBER TAPE CORE AND PRODUCTION METHOD THEREFOR

(75) Inventors: Masayoshi Suzuki, Shizuoka (JP); Ritsu Kawase, Shizuoka (JP); Kyoichi Sasaki, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 22 days.

(21) Appl. No.: 10/521,218

(22) PCT Filed: Jul. 14, 2003

(86) PCT No.: PCT/JP03/08909

§ 371 (c)(1),
(2), (4) Date: Jan. 13, 2005

(87) PCT Pub. No.: WO2004/008215

PCT Pub. Date: Jan. 22, 2004

(65) Prior Publication Data
US 2005/0117859 A1 Jun. 2, 2005

(30) Foreign Application Priority Data

| Jul. 15, 2002 | (JP) | ............................. 2002-205330 |
| Nov. 13, 2002 | (JP) | ............................. 2002-329030 |
| Feb. 6, 2003 | (JP) | ............................. 2003-28982 |

(51) Int. Cl.
*G02B 6/44* (2006.01)
(52) U.S. Cl. ........................................ 385/114; 385/128
(58) Field of Classification Search ................ 385/114, 385/128
See application file for complete search history.

(56) References Cited

U.S. PATENT DOCUMENTS

| 4,828,349 | A | * | 5/1989 | Nakasuji ..................... 385/126 |
| 4,932,740 | A | * | 6/1990 | Berkey et al. ................ 385/43 |
| 6,134,364 | A | * | 10/2000 | DeFabritis et al. ......... 385/114 |
| 6,222,969 | B1 | * | 4/2001 | Botelho et al. ............. 385/114 |
| 6,519,398 | B2 | | 2/2003 | Hwang |
| 6,535,673 | B1 | * | 3/2003 | Lochkovic .................. 385/114 |
| 6,628,866 | B1 | * | 9/2003 | Wilson et al. .............. 385/114 |
| 2003/0002831 | A1 | * | 1/2003 | Chandraiah et al. ........ 385/114 |
| 2003/0053772 | A1 | * | 3/2003 | Ikunishi et al. ............. 385/114 |

FOREIGN PATENT DOCUMENTS

| JP | 60-200213 | 10/1985 |
| JP | 60-221714 | 11/1985 |
| JP | 2-108012 | 4/1990 |
| JP | 2-271310 | 11/1990 |
| JP | 6-067071 | 3/1994 |
| JP | 9-197214 | 7/1997 |
| JP | 11-223754 | 8/1999 |
| JP | 11-326719 | 11/1999 |
| JP | 2001-111771 | 4/2000 |
| JP | 2000-231042 | 8/2000 |
| JP | 2001-166189 | 6/2001 |
| JP | 2002-090589 | 3/2002 |

* cited by examiner

*Primary Examiner*—Ellen E. Kim
(74) *Attorney, Agent, or Firm*—Jordan and Hamburg LLP

(57) ABSTRACT

An optical fiber tape core comprises an optical fiber core assembly and a coating layer formed of silicone rubber and arranged on at least one side of the optical fiber core assembly. In the optical fiber core assembly, plural optical fiber cores two-dimensionally are arranged in parallel with each other. The silicone rubber which forms the coating layer has a hardness of from 20 to 90 and a tensile strength of from 15 to 80 kgf/cm$^2$.

5 Claims, 14 Drawing Sheets

OPTICAL FIBER TAPE CORE AND PRODUCTION METHOD THEREFOR

This application is a 371 of PCT/JP03/08909 filed on Jul. 14, 2003.

TECHNICAL FIELD

This invention relates to optical fiber tape cores in each of which plural optical fiber cores two-dimensionally arranged in parallel with each other are united together in the form of a tape with a coating layer, and also to their fabrication process.

BACKGROUND ART

Optical fiber tape cores each of which is formed of a bundle of plural optical fiber cores united together are known for many years. Owing to the merit that a number of optical fibers can be connected all together, these optical fiber tape cores are widely used as optical transmission media in optical communications systems as a result of the rapid introduction of optical fiber cables in subscribers' systems in recent years.

An optical fiber tape core is required to have higher separability into single cores and higher strength, and active research and development work is under way in various companies. To provide optical fiber cores with both strength and separability into single cores, it is the common practice to form a coating layer in a two-layer construction—one being a primary coating layer uniting plural optical fiber cores together and the other a secondary coating layer uniting together such multi-core units covered with such primary coating layers, respectively—and to form the primary and secondary coating layers with UV curable resins different in strength and hardness.

In general, optical fiber tape cores coated with such UV curable resins are fabricated using acrylic materials. The resulting optical fiber tape cores are, however, accompanied by a problem in that they are not sufficient in hardness, durability and flexibility and tend to become loose or break, for example, when twisted. Concerning flexibility, on the other hand, these optical fiber tape cores also involve a problem in that they are extremely weak to bending in the direction of the cores and becomes loose or break although they have durability to folding.

Further, optical fiber tape cores coated with general UV curable resins are also accompanied by a further problem in that they are poor in shape restorability due to their plasticity attributable to the materials and, when wound on bobbins or the like upon storage, they continue to retain a wound shape, in other words, they develop curling and in actual work, for example, upon conducting connection to connectors or the like or performing installation work, this retention of a wound shape (curling) makes it difficult to handle them, resulting in poor workability.

Turning now to a process for the fabrication of optical fiber tape cores, the conventional fabrication of an optical fiber tape core has been conducted generally by the facilities illustrated in FIG. 22. Described specifically, an optical fiber tape core is fabricated by guiding plural optical fiber cores 2a-2h from a core feeder 16 to a core aligner 17 to align the individual optical fiber cores in parallel with each other along a line, introducing the thus-aligned individual optical fiber cores into a coating jig 18, coating the optical fiber cores all together around themselves with a coating material while filling the coating jig 18 with the coating material, feeding out the coated optical fiber cores through a hole of the coating jig 18, and then curing the coating material by a curing means 19 such as a UV irradiation unit. A typical coating jig is illustrated in FIG. 23. The coating jig 18 is constructed of an optical fiber feed-in hole 18a through which the optical fibers 2a-2h are inserted, a coating material reservoir 18b in which a coating material is filled, and an optical fiber feed-out hole 18c through which the optical fiber cores are fed out.

According to this process, however, it is necessary to keep the interior of the coating jig always filled with the coating material, leading to a problem that the material is wasted. This problem involves another problem in that to change the thickness and/or width of an optical fiber tape, a new coating jig equipped with a different hole for feeding optical fiber cores therethrough is needed, thereby making it difficult to readily change the thickness and/or width of the optical fiber tape.

In the above described process, it is also necessary to feed plural optical fiber cores, which are before their formation into a tape and are single cores in a loose state, through the aligner 17 while aligning them with each other and then to insert them into the very small holes (18a and 18c) of the coating jig 18. This setting of the optical fiber cores is troublesome and time-consuming, leading to a reduction in work efficiency. With respect to a demand for the fabrication of a short-distance optical fiber tape core or the formation of an optical fiber tape core into a tape only at a necessary position, the fabrication facilities are difficult to meet such a demand because the distance from the core feeder 16 to the curing unit 19 is tong and fabrication conditions such as the coat thickness do not become constant shortly after an initiation of fabrication.

When fabricating a short-distance optical fiber tape core, forming an optical fiber tape core into a tape only at a necessary position or reinforcing an optical fiber tape core only at a part thereof, it is strongly required to provide the optical fiber tape core with a thicker coating layer, a wider coating layer or the like especially from the standpoint of protection of the optical fibers to be wired within a system. However, the above-described conventional process can by no means meet or is difficult to meet these requirements.

From the standpoint of protecting optical fibers drawn out of optical connectors or an optical component, it is strongly required to form them into a tape. The above-described process is, however, accompanied by a problem in that the tape formation can be hardly effected. The above-described process involves a further problem in that, when optical fibers are wired in a very narrow place, it cannot effect the tape formation.

The present invention has been completed to resolve such problems of the conventional technology as described above. Specifically, an object of the present invention is to provide an optical fiber tape core, which has excellent strength and good flexibility and hardly retains a wound shape (curling).

Another object of the present invention is to provide a process for the fabrication of an optical fiber tape core, which can coat plural optical fiber cores all together in a simple manner. A further object of the present invention is to provide a process for the fabrication of an optical fiber tape core, which can feed a coating material to optical fiber cores only as much as required, can feed a coating material even when the area to be coated extends over a short distance or is partial, can feed a coating material even when optical fiber cores to be coated are wired in a very narrow place, or can feed a coating material to optical fiber cores to form it into a tape while controlling the thickness and/or width of the coating of the tape. A still further object of the present invention is to provide a process for the fabrication of an optical fiber tape core, which can simplify the setting of plural optical fiber cores, can apply a coating over a short distance or on a partial area without wasting a coating material, or can also form into a tape plural optical fiber cores provided at one ends or both ends thereof with optical components such as optical connectors.

DISCLOSURE OF THE INVENTION

An optical fiber tape core according to the present invention comprises an optical fiber core assembly with plural optical fiber cores two-dimensionally arranged in parallel with each other and a coating layer formed of silicone rubber and arranged on at least one side of the optical fiber core assembly. In the optical fiber tape core according to the present invention, the silicone rubber forming the coating layer can preferably have a hardness of from 20 to 90 and a tensile strength of from 15 to 80 $kgf/cm^2$.

In the present invention, the optical fiber core assembly may be provided on both upper and lower sides thereof with coating layers formed of the silicone rubber, and may also be provided on side walls thereof with additional coating layers formed of the silicone rubber. These coating layers can bring about further improvements in strength.

The term "hardness" as used herein means "durometer hardness" as measured following the procedure prescribed in JIS K6253. Specifically, the term "hardness" means a value measured by preparing a specimen 6 mm thick of silicone rubber, pressing a needle of a Type A durometer against the specimen without any impact from a point right above an upper surface of the specimen, and reading graduations. A durometer is a testing machine for determining a hardness from a penetration depth of a needle when the needle is pressed by means of a spring.

On the other hand, the term "tensile strength" as used herein means "tensile strength at break" as measured following the procedure prescribed in JIS K6251. Specifically, the term "tensile strength" means a value [$kgf/cm^2$] calculated by preparing a JIS No. 2 dumbbell-shaped specimen about 2 mm thick of silicone rubber, pulling the specimen at a pulling speed of 500 mm/min, and dividing a load value, when the specimen was broken, by a cross-sectional area of the specimen.

The optical fiber tape core according to the present invention can also be characterized in the use of a silicone rubber material, which has the above-described hardness and tensile strength, as a coating material, and owing to the excellent shape restorability of the silicone rubber, is extremely good in workability and handling without developing curling or retaining a wound shape even when wound on a bobbin or the like.

A process according to the present invention for the fabrication of an optical fiber tape core is a process for fabricating the optical fiber tape core by coating plural optical fiber cores all together, and in a first embodiment thereof, comprises bringing at least one nozzle close to the surfaces of the plural optical fibers aligned in parallel with each other on a two-dimensional flat surface; and then, while delivering silicone rubber from the nozzle, causing the nozzle to undergo a relative movement in a direction of axes of the optical fibers such that the plural optical fibers are coated all together to form a coating layer.

The process according to the present invention for the fabrication of the optical fiber tape core comprises, in a second embodiment thereof, applying silicone rubber onto the plural optical fiber cores arranged on a two-dimensional flat surface; and with a shaping jig having a shaping groove and being arranged such that the plural optical fiber cores are located in the shaping groove or are located underneath in proximity of the shaping groove, causing the forming jig to undergo a relative movement in a direction of axes of the optical fiber cores such that the silicone rubber is shaped to form a coating layer.

The process according to the present invention for the fabrication of the optical fiber tape core comprises, in a third embodiment thereof, arranging the optical fiber cores on a two-dimensional flat surface; and with a shaping jig having a shaping groove provided with a through-hole for feeding silicone rubber and being arranged such that the plural optical fiber cores are located in the shaping groove or are located underneath in proximity of the shaping groove, causing the shaping jig to undergo a relative movement in a direction of axes of the optical fiber cores such that with the silicone rubber fed into the shaping groove from the through-hole, the optical fiber cores are coated and shaped to form a coating layer.

The process according to the present invention for the fabrication of the optical fiber tape core comprises, in a fourth embodiment thereof, mounting the optical fiber cores in alignment with each other on a two-dimensional flat surface; applying silicone rubber onto the two-dimensional flat surface such that the two-dimensional surface with the plural optical fiber cores mounted therein is coated with the silicone rubber to form a coating layer; and peeling off the plural optical fiber cores from the two-dimensional flat surface to separate, from the coating layer on the two-dimensional flat surface, only a part thereof located on the optical fiber cores.

In these first to fourth embodiments of the present invention, it is preferred to use silicone rubber having a hardness of from 20 to 90 and a tensile strength of from 15 to 80 $kgf/cm^2$.

LEGEND

1 . . . optical fiber tape core, 2,2a-2h . . . optical fiber core, 3 . . . coating material, 3a,3b . . . coating layer, 4,4',4" . . . nozzle, 4a . . . opening, 5 . . . substrate, 6 . . . adhesive tape, 7 . . . shaping jig, 7a . . . shaping groove, 7b . . . through-hole, 7f . . . leg, 8 . . . pipe, 9 . . . 1—axis controlled robot, 10 . . . flat substrate, 11 . . . ball screw shaft, 12 . . . movable unit, 13 . . . coating material feeder, 14 . . . drive motor, 15 . . . journal bearing, A . . . coating start position, B . . . coating end position.

BEST MODES FOR CARRYING OUT THE INVENTION

The embodiments of the present invention will hereinafter be described in detail with reference to the drawings.

Figure 1:
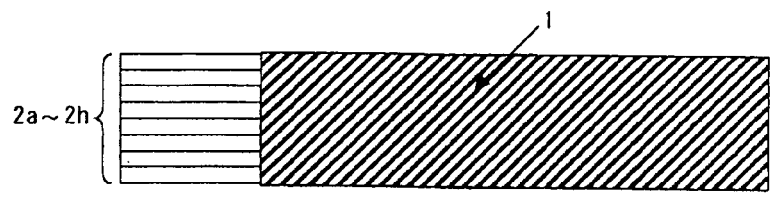
FIG. 1 is a partly cut-away, schematic plan view illustrating one example of preferred embodiments of the optical fiber tape core according to the present invention.
Figure 2:
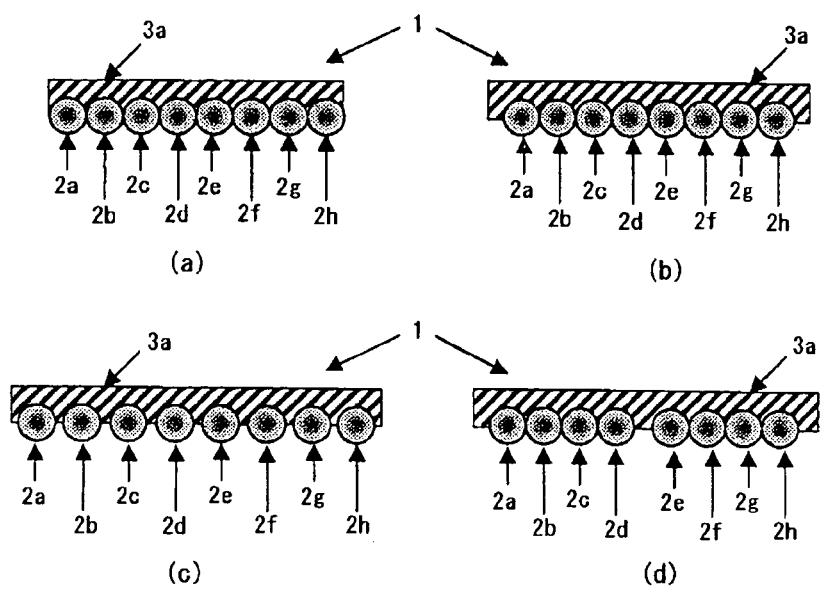
FIG. 2 shows schematic cross-sectional views of optical fiber tapes each of which is of such a form that a coating layer is arranged on one side of an optical fiber core assembly.
Figure 3:
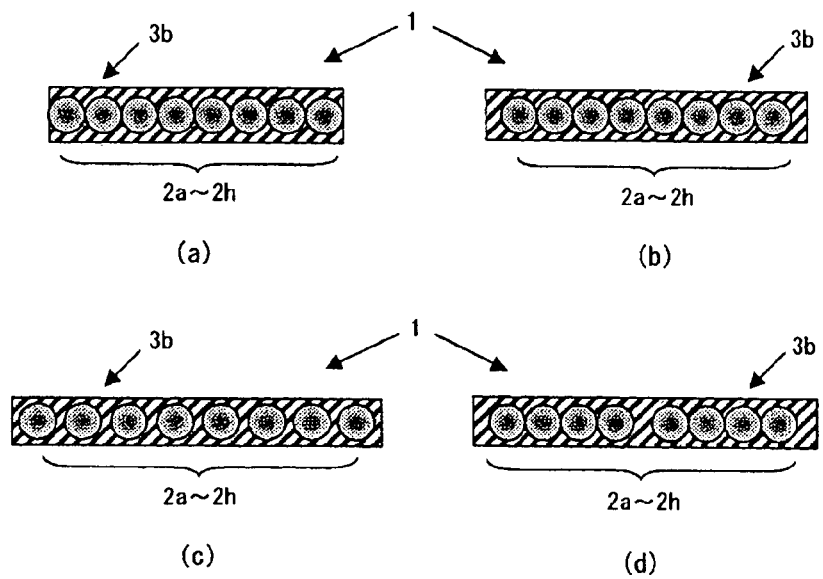
FIG. 3 shows schematic cross-sectional views of optical fiber tapes each of which is of such a form that coating layers are arranged on both sides of an optical fiber core assembly.

In FIG. 1 through FIG. 3, each optical fiber tape core 1 is provided with eight optical fiber cores 2a-2h arranged in parallel with each other, and a coating layer 3a or 3b formed of silicone rubber of the above-described properties is arranged in spaces between the optical fiber cores and on upper sides or upper and lower sides of the optical fiber cores.

In the present invention, it is only necessary for the coating layer 3a that as illustrated in FIG. 2(a) through FIG. 2(d), it is formed on one side of a two-dimensional assembly of the optical fiber cores arranged in parallel with each other. The coating layer 3a may protrude somewhat onto side walls of the two-dimensional assembly. It is only necessary for the optical fiber cores that they are arranged two-dimensionally in parallel with each other, and no problem or inconvenience arises even when some spaces are left between the adjacent optical fiber cores. These spaces can be either equal to or different from each other. Further, the spaces may be filled with silicone rubber.

As illustrated in FIG. 3(a) through 3(d), coating layers can be arranged on both sides of a two-dimensional assembly of optical fiber cores arranged in parallel with each other. In this case, the eight optical fiber cores 2a-2h arranged in parallel with each other are coated with a coating layer 3b of silicone rubber such that they are covered at outer peripheries thereof. The coating layer 3b may protrude somewhat onto side walls of the two-dimensional assembly. It is only necessary for the optical fiber cores that they are arranged in parallel with each other, and no problem or inconvenience arises even when some spaces are left between the adjacent optical fiber cores. Further, the spaces may be filled with silicone rubber.

The silicone rubber forming the coating layer of the optical fiber tape core according to the present invention may preferably have a hardness of from 20 to 90 and a tensile strength of from 15 to 80 kgf/cm$^2$. More preferred silicone rubber has a hardness of from 25 to 75 and a tensile strength of from 15 to 60 kgf/cm$^2$. Still more preferred silicone rubber has a hardness of from 30 to 65 and a tensile strength of from 15 to 50 kgf/cm$^2$.

Silicone rubber the hardness and tensile strength of which are lower than 20 and lower than 15 kgf/cm$^2$, respectively, cannot provide the resulting optical fiber tape core with sufficient strength against lateral pressures, twisting and the like, so that during fabrication or installation, the optical fiber tape cores are susceptible to breakage even under a small strain. If the hardness is higher than 90 and the tensile strength is higher than 80 kgf/cm$^2$, on the other hand, the resulting optical fiber tape core is sufficient neither in flexibility nor in separability into single cores.

In the present invention, no particular limitation is imposed on the silicone rubber insofar as its hardness and tensile strength fall within the above-described corresponding ranges. The addition reaction curing type, the condensation reaction curing type, and the vulcanizable type are all usable. Among these, silicone rubber of the addition reaction curing type or the condensation reaction curing type is preferred for its production of less byproducts and its good workability.

The thickness of the optical fiber tape core can be selectively determined as needed in accordance with its application purpose. In general, however, the thickness, including that of optical fiber cores, can be set within a range of from 300 μm to 480 μm, preferably from 330 μm to 430 μm, more preferably from 350 μm to 410 μm when the employed optical fiber cores have a thickness of 250 μm. Further, the width of the optical fiber tape core can also be selectively determined as needed in accordance with its application purpose. In general, however, the width, including that of optical fiber cores, can be set within a range of form 2,000 μm to 2,300 μm, preferably from 2,050 μm to 2,250 μm when eight optical fiber cores having a diameter of 250 µm are arranged in parallel with each other.

In addition, no particular limitation is imposed on the number of optical fiber cores in the optical fiber tape core according to the present invention, so that the optical fiber tape core can be a 2-core or 12-core optical-fiber tape core in addition to a 4-core optical-fiber tape core equipped with four optical fiber cores or an 8-core optical-fiber tape core equipped with eight optical fiber cores.

The optical fiber tape core according to the present invention, which has such a construction as described above, has sufficiently high strength and excellent flexibility and also sufficient anti-curling property, so that its optical fiber cores neither undergo breakage nor develop curling when handled upon connecting them to connectors or during installation work. Accordingly, the optical fiber tape core according to the present invention has high reliability and assures improvements in the safety and efficiency of work. Because the optical fiber tape core according to the present invention has excellent separability into single cores, the work to separate the optical fiber cores from each other can be performed easily without failure.

The optical fiber tape core according to the present invention is fabricated using silicone rubber as a coating material. It is preferred to fabricate the optical fiber tape core in accordance with the above-described first to fourth embodiments of the present invention.

Figure 4:
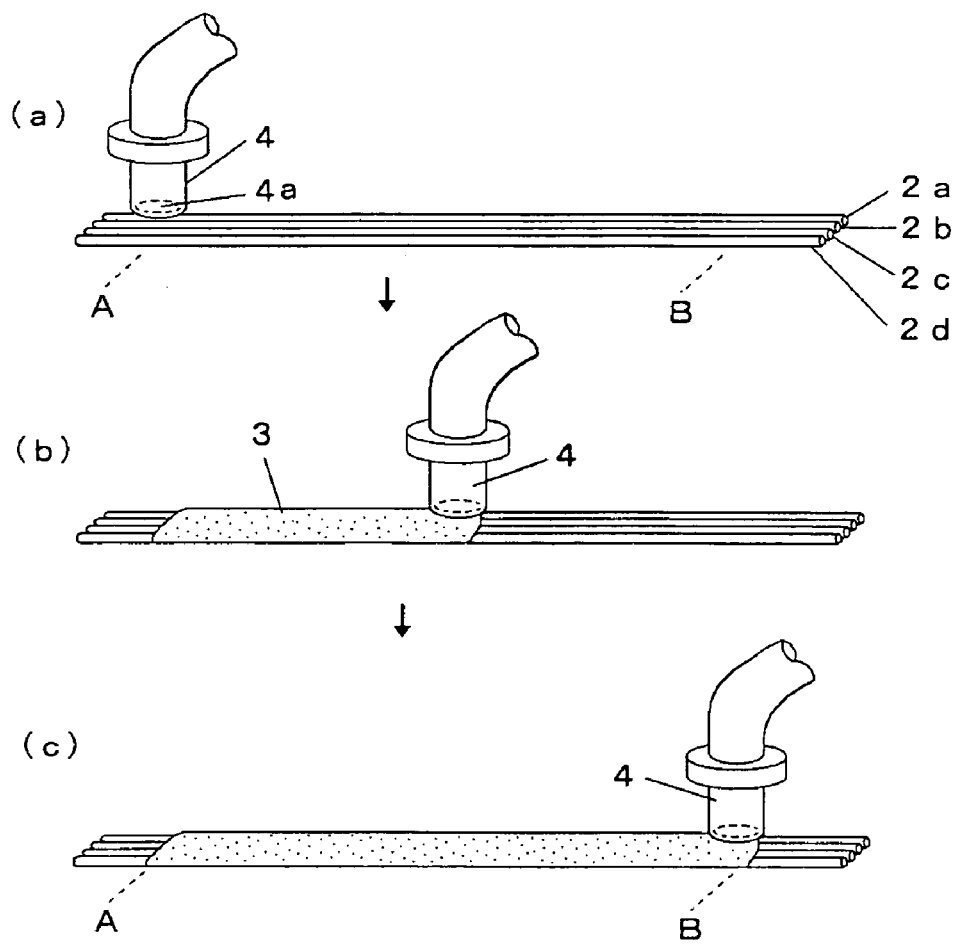
FIG. 4 shows flow diagrams illustrating a first embodiment of the process according to the present invention for the fabrication of an optical fiber tape core.

Firstly, the first embodiment of the process of the present invention for the fabrication of an optical fiber tape core will be described with reference to the drawings. The first embodiment of the process for the fabrication of the optical fiber tape core firstly comprises, as illustrated in FIG. 4, moving a nozzle 4 to a coating start position A and to a proximity of the surfaces of plural optical fiber cores 2a-2d aligned in parallel with each other on a two-dimensional flat surface (FIG. 4(a)). Next, the nozzle 4 is moved in a direction of axes of the optical fibers while delivering a coating material 3 from an opening 4a in a tip of the nozzle (FIG. 4(b)). After the nozzle 4 is moved to a coating end position B, the delivery of the coating material from the opening in the tip of the nozzle is stopped to finish the coating of the coating material to the optical fibers (FIG. 4(c)). An optical fiber tape core of a uniform shape can be fabricated by controlling the moving speed of the nozzle 4 and the delivery rate of the coating material to predetermined values during the above-described operation. By changing the moving speed of the nozzle and the delivery rate during the coating, it is also possible to change the shape of the coating. By making the optical fiber tape core thicker at a part thereof, the optical fiber tape core can be improved in mechanical strength. By controlling the distance of movement, it is possible to fabricate an optical fiber tape core of a desired length. Accordingly, an optical fiber tape core can be formed into a tape over a predetermined length thereof. Subsequently, the coating material so applied may be dried or cured as needed.

In the present invention, the movement of the nozzle 4 can be effected by using any means, for example, can be effected either manually or automatically without any problem or inconvenience. It is, however, preferred to use such a system that permits control of the moving speed and also permits a movement at a constant speed and a stop. It is to be noted that the movement of the nozzle in the present invention is only required to be relative and either the nozzle or the optical fiber cores can be moved forwards each other, respectively. As the coating material is applied by the nozzle in the present invention, even optical fiber cores wired in a very narrow space can be formed into a tape insofar as there is a space sufficient to permit an insertion of the nozzle.

Figure 5:
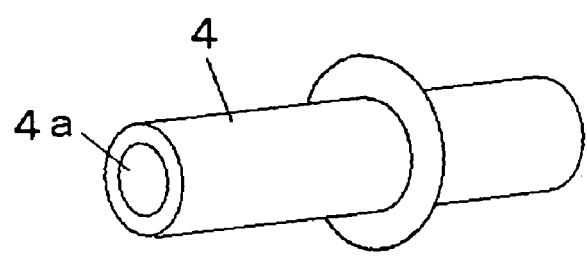
FIG. 5 is a perspective view of one example of a nozzle useful in the process according to the present invention for the fabrication of the optical fiber tape core.

The nozzle for use in the present invention may preferably be in a tubular shape as depicted in FIG. 5. The material of the nozzle 4 may preferably be, but not particularly limited to, a material which does not corrode or has low reactivity to chemical substances, e.g. stainless steel, fluorinated resin or the like. The nozzle is connected to the coating material feeder. For the feeding of the coating material from the coating material feeder, any means can be used, for example, the feeding can be either manual or automatic. It is, however, preferred to permit control of the feed rate of the coating material. The opening 4a in the tip of the nozzle can be of any shape, for example, can be circular, elliptic, rectangular or so. Any modifications can be applied to the nozzle, for example, a blade-like part can be attached to the tip of the nozzle. Further, no particular limitation is imposed on the diameter of the opening insofar as the coating material can be delivered onto the optical fiber cores.

Figure 6:
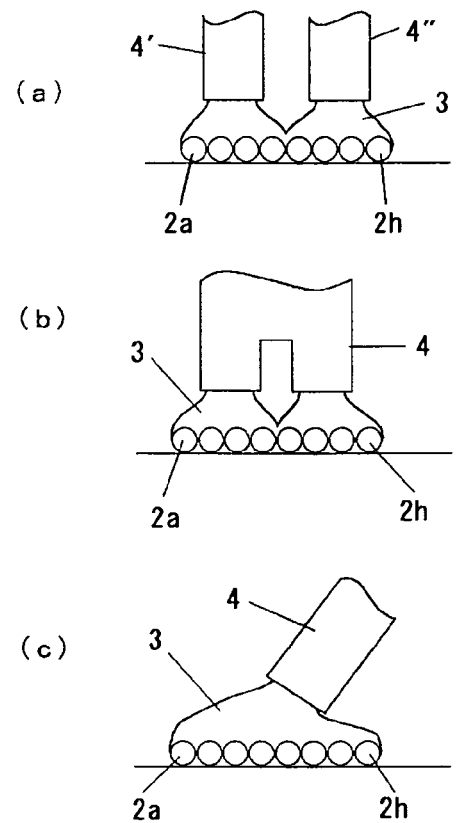
FIG. 6 shows side views of various nozzles useful in the present invention.

In the present invention, the nozzle for use in applying the coating material is not necessarily limited to a single nozzle, but can be in the form of plural nozzles. FIG. 6(a) shows by way of example the inclusion of two nozzles (4',4"). As illustrated in FIG. 6(b), the nozzle can be in the form of plural nozzles integrated together or in the form of a single nozzle provided with plural openings. As depicted in FIG. 6(c), the nozzle can be one arranged with an inclination to the two-dimensional flat surface.

Figure 7:
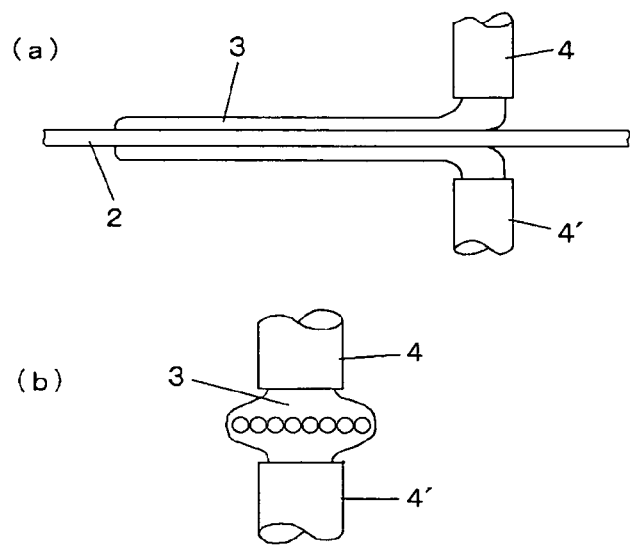
FIG. 7 illustrates another example of the first embodiment of the process according to the present invention for the fabrication of the optical fiber tape core, in which FIG. 7(*a*) is a side view and FIG. 7(*b*) is a front view.

In another example of the first embodiment of the fabrication process according to the present invention as illustrated in FIG. 7, a coating material is applied, to both sides of optical fiber cores aligned in parallel with each other which is different from the example of FIG. 4. Described specifically, nozzles 4 and 4' are brought close to both of the upper and lower sides of the plural optical fiber cores aligned in parallel with each other, and while delivering a coating material 3 from the openings in the tips of the respective nozzles, the nozzles are both moved in the direction of the axes of the optical fibers. As a result, the plural optical fiber cores are coated with the silicone rubber on the both sides thereof. It is to be noted that, although the optical fiber cores are coated on both of the upper and lower sides thereof in FIG. 7, the optical fiber cores can be arranged in parallel with each other in a vertical direction, that is, in an up-and-down direction and can be coated on both left and right sides thereof.

Figure 8:
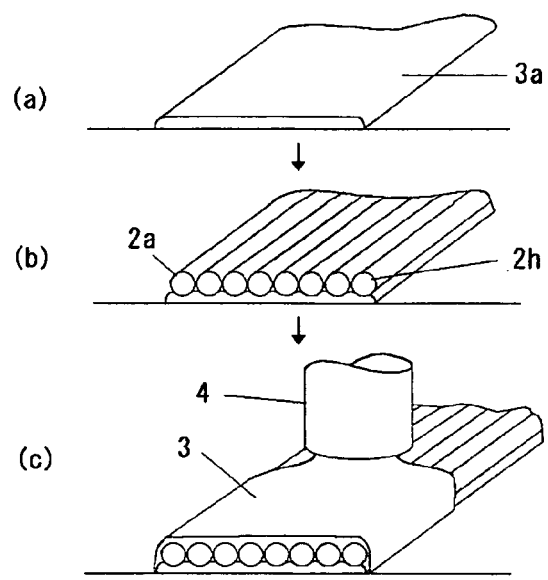
FIG. 8 shows flow diagrams illustrating a further example of the first embodiment of the process according to the present invention for the fabrication of the optical fiber tape core.

In a further example of the first embodiment shown in FIG. 8, a coating material for the rear side of optical fibers is applied beforehand in the form of a two-dimensional flat surface on a releasing substrate to form a coating layer 3a (FIG. 8(a)). After plural optical fiber cores 2a-2h are aligned and held in place on the coating layer 3a (FIG. 8(b)), a coating material 3 is applied by the above-described method from a nozzle 4 onto the surfaces of the optical fiber cores aligned in parallel with each other to obtain an optical fiber tape core coated on both sides (FIG. 8(c)).

When applying the coating material to the optical fiber cores, the position of the nozzle relative to the plural optical fiber cores can be set so as to permit the application of the coating material onto all the optical fiber cores. It is to be noted that the clearance between the nozzle and the optical fiber cores can be selectively determined as needed to form the coating layer with desired shape and thickness. In the present invention, it is also possible to change the coating conditions in the course of the coating operation. Described specifically, the moving speed of the nozzle, the clearance between the nozzle and the optical fiber cores and the delivery rate of the coating material can be changed as needed, and therefore, can be selectively determined, for example, depending on the application purpose and the system construction. The stop of the delivery of the coating material from the nozzle at the coating end position and the movement of the nozzle can be selectively determined depending on the shape of the tape and the application purpose. For example, the delivery of the coating material from the moving nozzle can be stopped at the coating end position, and the nozzle can then be moved further such that the nozzle passes beyond the coating end position.

According to the above-described first embodiment of the process of the present invention for the fabrication of an optical fiber tape core, the coating material can be applied only as much as needed owing to the use of the nozzle so that the optical fiber tape core can be fabricated without waste of material. As the moving speed and distance of the nozzle can be controlled, it is also possible to feed the coating material to optical fiber cores even at parts thereof or over a short distance, and moreover, it is also possible to coat optical fiber cores all together with the coating material over a desired distance with desired tape width and thickness. Accordingly, optical fiber cores can be formed into a tape in order to improve mechanical strength, handling workability and the like. In addition, the use of the nozzle which is a very small coating jig makes it possible to coat plural optical fiber cores all together even if they are those drawn out of an optical component or optical connectors or those wired in a narrow place.

Figure 9:
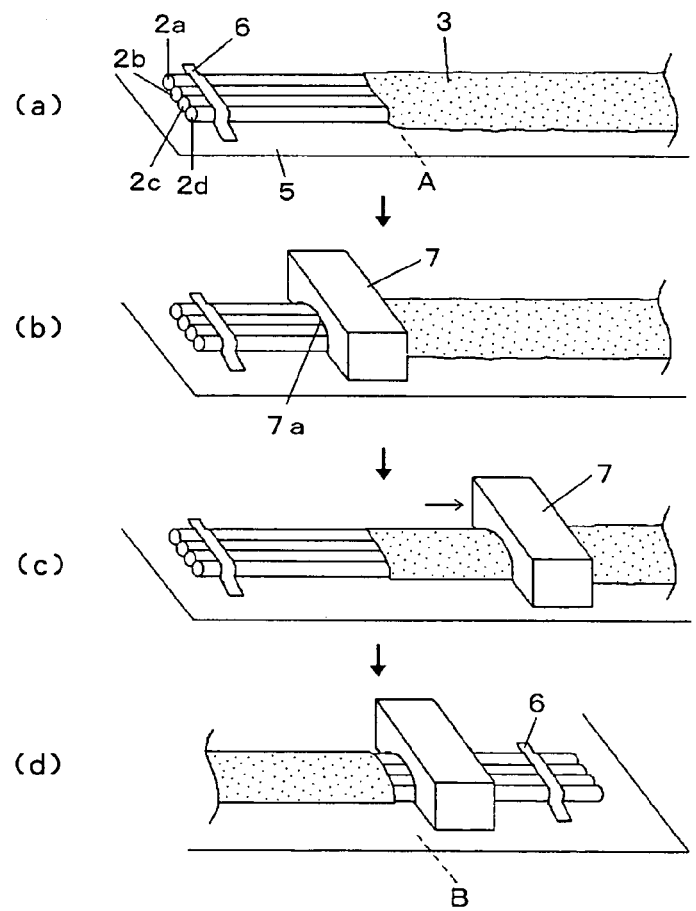
FIG. 9 shows flow diagrams illustrating a second embodiment of the process according to the present invention for the fabrication of the optical fiber tape core.

The second embodiment of the process of the present invention for the fabrication of an optical fiber tape core will next be described with reference to the drawings. The second embodiment of the process for the fabrication of the optical fiber tape core firstly comprises, as illustrated in FIG. 9, arranging plural optical fiber cores (four optical fiber cores in the diagrams) 2a-2d in alignment with each other on a two-dimensional flat surface and fixing them at end portions thereof with an adhesive tape 6. A coating material 3 is then applied beforehand over the optical fiber cores (FIG. 9(a)). From a point above the plural optical fiber cores 2a-2d, a shaping jig 7 provided on a bottom wall thereof with a shaping groove 7a is next caused to descend, and is mounted on the flat surface such that the plural optical fiber cores are arranged in the shaping groove of the shaping jig (FIG. 9(b)). The shaping jig 7 is then moved in the direction of the axes of the optical fiber cores. As an alternative, the optical fiber cores may be moved instead of the shaping jig. It is to be noted that the optical fiber cores may be arranged underneath in close proximity of the shaping groove of the shaping jig 7 rather than being arranged in the shaping groove, and the shaping jig 7 may then be moved in the direction of the axes of the optical fiber cores. By this operation, the shape of the resulting silicone rubber coating layer is determined by the shaping groove of the shaping jig, and the coating layer is thus formed with shape forming from the coating start position A (FIG. 9(c)). The shaping jig is moved continuously to the coating end position B, thereby completing the shaping of the silicone rubber coating layer (FIG. 9(d)). Subsequently, the thus-shaped silicone rubber coating layer may be dried or cured as needed.

According to the above-described second embodiment, the setting of the optical fibers at the time of the initiation of the fabrication of the optical fiber tape core is completed by positioning the plural optical fiber cores on the flat surface in the shaping groove of the shaping jig or on the flat surface underneath the shaping groove of the shaping jig held in a proximity of the flat surface. The setting of the optical fibers for performing their formation into a tape can, therefore, be conducted very easily in a short time. Because the shaping of the coating material is effected by simply moving the shaping jig of the simple construction, which is provided only with the shaping groove, in the direction of the axes of the optical fiber cores, the formation into the tape can be conducted very easily.

Figure 10:
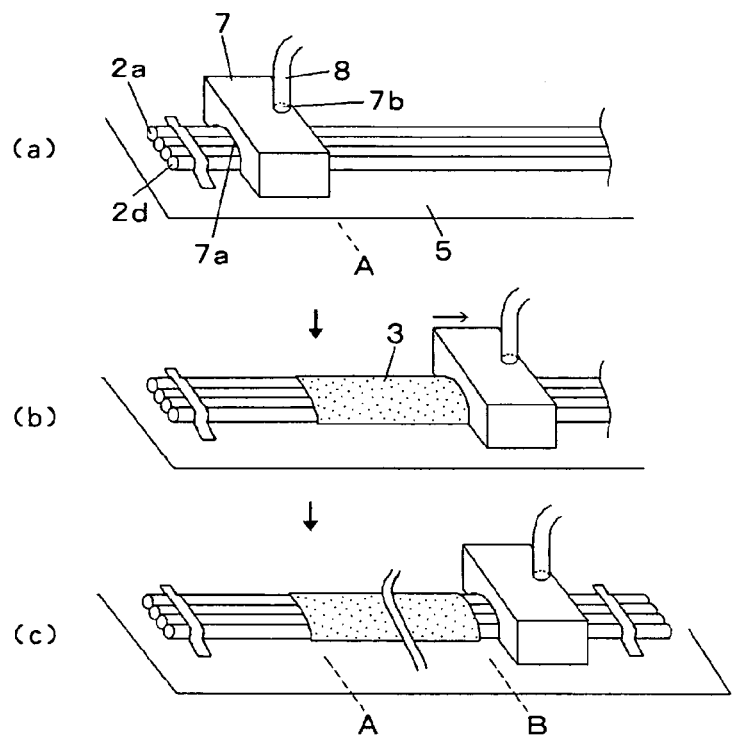
FIG. 10 shows flow diagrams illustrating a third embodiment of the process according to the present invention for the fabrication of the optical fiber tape core.

The third embodiment of the process for the fabrication of an optical fiber tape core will next be described with reference to the drawings. As shown in FIG. 10, the third embodiment firstly comprises, in a similar manner as in the above-described embodiment depicted in FIG. 9, arranging plural optical fiber cores (four optical fiber cores in the diagrams) 2a-2d in alignment with each other on a two-dimensional flat surface, causing a shaping jig 7, which is provided on a bottom wall thereof with a shaping groove 7a and is also provided with a through-hole 7b for feeding a coating material, to descend from a point above the plural optical fiber cores, and mounting the shaping jig on the flat surface such that the plural optical fiber cores are arranged in the shaping groove of the shaping jig (FIG. 10(a)). It is to be noted that as an alternative, the optical fiber cores may be arranged underneath in close proximity of the shaping groove of the shaping jig 7 rather than being arranged in the shaping groove. The shaping jig 7 is then moved in the direction of the axes of the optical fiber cores. When the shaping jig has reached a predetermined position, specifically a coating start position A, the coating material is fed from an unillustrated coating material feeder to a through-hole 7b via a pipe 8 and the delivery of the coating material is started, and the shaping jig is moved while feeding the coating material 3 (FIG. 10(b)). When the shaping jig has reached a coating end position B, the delivery of the coating material is stopped to complete the coating of the optical fiber cores and the shaping of the resulting coating layer (FIG. 10(c)). It is to be noted that the optical fiber cores may be moved although the shaping jig was moved in the above-described procedure. Subsequently, the thus-shaped silicone rubber coating layer may be dried or cured as desired.

Figure 11:
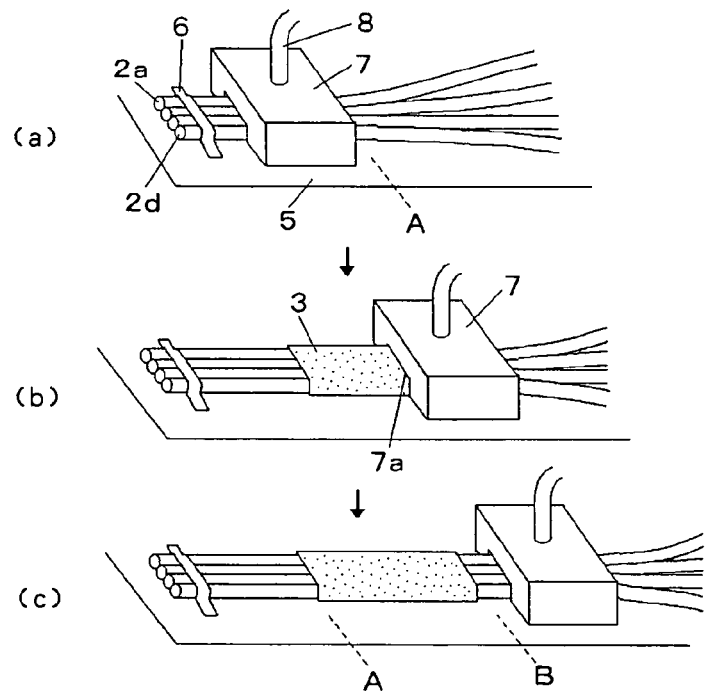
FIG. 11 shows flow diagrams illustrating another example of the third embodiment of the process according to the present invention for the fabrication of the optical fiber tape core.

FIG. 11 shows flow diagrams of another example of the third embodiment of the process of the present invention for the fabrication of an optical fiber tape core. In this example, coating is conducted while bringing unaligned optical fiber cores into alignment with each other. Plural optical fiber cores, specifically optical fiber cores 2a-2d, which are arranged on a two-dimensional flat surface but are not in alignment with each other, are rendered flush with each other at one ends thereof and are held in place with an adhesive tape 6, and on the core portions rendered flush with each other, a shaping jig 7 is mounted (FIG. 11(a)). When the shaping jig has reached a coating start position A by moving it, the coating material is fed to the shaping jig 7 via a pipe 8 to initiate coating and shaping. With the movement of the shaping jig, the unaligned optical fiber cores are brought into alignment with each other by a shaping groove 7a of the shaping jig, said shaping groove being rectangular in cross-section, and the coating material is fed on the optical fiber cores to perform coating and shaping (FIG. 11(b)). When the shaping jig has reached a coating end position B, the delivery of the coating material is stopped to complete the coating of the optical fiber cores and the shaping of the resulting coating layer (FIG. 11(c)). Subsequently, the thus-shaped silicone rubber coating layer may be dried or cured as desired.

Figure 12:
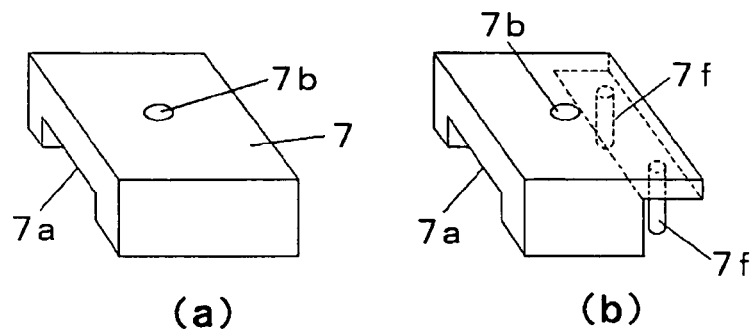
FIG. 12 shows perspective views of shaping jigs usable in FIG. 11.

Examples of the shaping jig 7 employed in the above-described procedure can include those of the constructions shown in FIG. 12(a) and FIG. 12(b), respectively. Different from the shaping jig shown in FIG. 10, each of the shaping jigs shown in FIG. 12(a) and FIG. 12(b) is provided with a through-hole 7b at a substantially central part of the shaping jig as viewed in the direction of the length thereof, and its shaping groove 7b is rectangular in cross-sectional shape. With any one of these shaping jigs, it is hence possible to bring optical fiber cores into alignment with each other. Incidentally, the term "alignment" as used herein means to put optical fiber cores together side by side into a state ready to conduct the coating of a coating material by regulating, prior to the coating, movements of the optical fiber cores such that their coating with the coating material becomes feasible. As illustrated in FIG. 12(a), the shaping jig for use in this procedure is, therefore, provided with a function to regulate the movements of the optical fibers by a portion of the shaping groove having the rectangular shape in cross-section, said portion being located forward of the through-hole through which the coating material is delivered, such that the optical fibers are put together side by side. The shaping jig illustrated in FIG. 12(b), on the other hand, has two legs 7f,7f at an interval either equal to or slightly wider than the width of the shaping groove, and has a function to put optical fibers together side by side.

Figure 13:
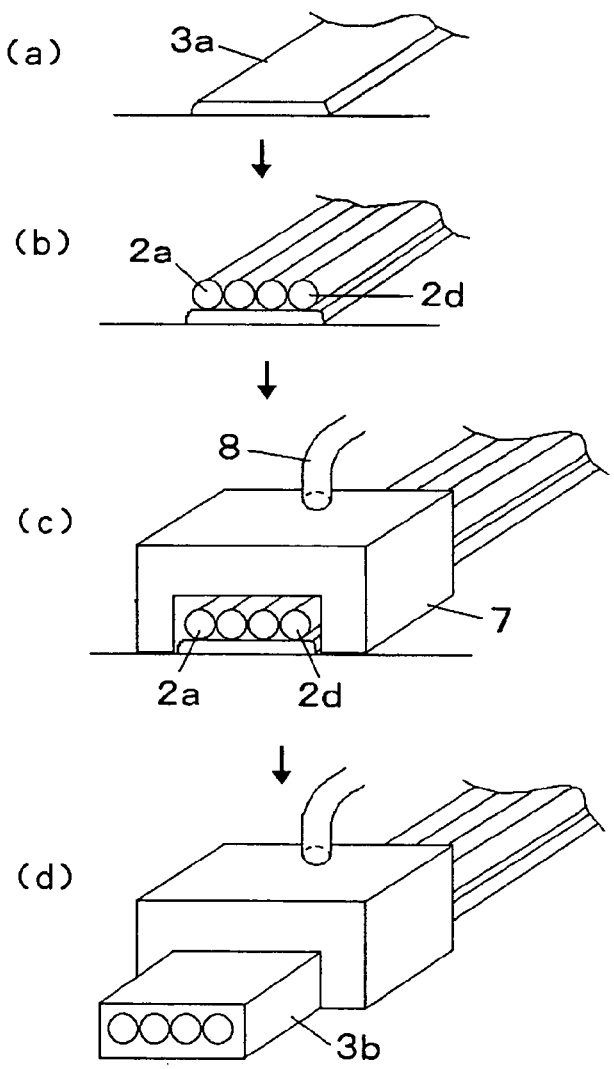
FIG. 13 shows flow diagrams illustrating a further example of the third embodiment of the process according to the present invention for the fabrication of the optical fiber tape core.

FIG. 13 shows flow diagrams of a further example of the third embodiment, and illustrates a procedure to fabricate an optical fiber tape core of a construction coated on both sides thereof. Described specifically, a coating material for the rear side is applied on a two-dimensional flat surface to form a coating layer 3a (FIG. 13(a)), and on the coating layer, plural optical fiber cores (four optical fiber cores in the drawing) 2a-2d are arranged in alignment with each other (FIG. 13(b)). Subsequently, a shaping jig 7 provided with a through-hole is mounted such that the optical fiber cores 2a-2d are received in a shaping groove of the shaping jig (FIG. 14(c)). The same coating material is fed to the shaping jig through a pipe 8 to perform coating and shaping, whereby an optical fiber tape core is formed with both sides thereof coated with the coating layer 3b formed of silicone rubber (FIG. 13(d)).

As the coating material is fed to the shaping groove of the shaping jig in the above-described third embodiment, the coating and shaping of the coating material can be conducted in a single step by the single shaping jig. By controlling the feed position and feed rate of the coating material from a coating material feeder, it is also possible to avoid any over-feeding of the coating material to make an improvement in the material yield of the coating material and further, to set the width and thickness of the resulting tape as desired. By controlling the distance of a relative movement of the shaping jig, it is also possible to form optical fiber cores into a tape over a short distance thereof or to form parts of optical fiber cores into a tape at a desired position. It is to be noted that the term "relative" as used herein means that either the shaping jig or the arranged optical fiber cores can be moved forwards each other, respectively.

For use in the fabrication process of the second or third embodiment, any shaping jig can be selected depending upon the application object or the like of the optical fiber tape core insofar as it is equipped with a shaping groove. No particular limitation is imposed on the cross-sectional shape of the shaping jig because it can be selected as needed depending upon the shape of the applied coating material and its specification, but for example, a semielliptic, rectangular or semicircular cross-sectional shape or the like can be mentioned. The shaping jig can be of either a single-piece, unitary structure made of a single material or a structure of discrete parts assembled together. Further, the height, width and length of the shaping groove of the shaping jig can be selectively set as desired. The height is not required to be constant in the shaping jig, and may vary as needed. In addition, no particular limitation is imposed on the position of the shaping groove in the direction of the width of the shaping jig, and the shaping groove can be arranged at any position insofar as it is located within the width of the shaping jig. Furthermore, it is not necessary to limit to one (1) as the number of shaping groove(s) to be arranged in a shaping jig. For example, a single shaping jig can be provided with plural shaping grooves to fabricate plural optical fiber tape cores at once. A shaping groove of a shaping jig can be chamfered off at an upstream end portion thereof to facilitate the introduction of optical fiber cores into the shaping groove. As described above, it is also possible to use a shaping jig of the construction that two legs are arranged at an interval either equal to or wider than the width of the shaping groove to regulate optical fibers into alignment with each other (FIG. 12(b)) or a shaping jig of a construction that the width of its shaping groove is rendered somewhat wider into a tapered shape on the feed-in side of optical fibers.

No particular limitation is imposed on the size of the shaping jig, and the size can be selectively set as desired, for example, depending upon the number or the like of optical fiber tape cores. No particular limitation is imposed on its shape either. For example, a shape such as a quonset-shaped or parallelepipedal shape can be mentioned. Moreover, no particular limitation is imposed on the material which makes up the shaping jig, but preferred examples include materials having small friction coefficients such as polyacetal resins, materials having good mechanical properties such as materials resistant to thermal deformations, none-corrosive materials such as stainless steel, trifluoroethylene resin and tetrafluoroethylene resin, and materials having low resistance to chemical substances and solvents.

The shape of the through-hole arranged in the shaping jig to feed the coating material can be selectively set depending upon its application purpose, and therefore, the through-hole can have any shape. Illustrative are circular shape, elliptic shape, and rectangular shape. It is unnecessary to arrange only one through-hole, and plural through-holes may be arranged. No particular limitation is imposed on the size of the through-hole insofar as it can feed the coating material and can apply the coating material onto the optical fiber cores. Further, the through-hole can be located at any position insofar as it extends to the shaping groove. Moreover, the direction of the through-hole is not required to be perpendicular to the flat surface, and may have an inclination with respect to the flat surface.

To bring the optical fiber cores into alignment with each other by the shaping jig, the shaping jig is required to have, at a part thereof forward of the through-hole through which the coating material is fed, a construction that can regulate movements of the optical fiber cores and can put the optical fiber cores together side by side, as mentioned above. In this case, it is preferred to have such a construction that the optical fiber cores can be regulated not only in vertical movements but also in lateral movements. As an example of such a construction, one having a shaping groove of a rectangular shape in cross-section as mentioned above can be mentioned.

In the present invention, the shaping jig is required to be movable vertically and laterally relative to the optical fiber cores. Its operation can be effected manually. To precisely form a coating on the optical fiber tape core, however, it is more preferred to use a machine that performs the coating mechanically or automatically. As a means for moving the shaping jig in the direction of the axes of the optical fiber cores, any means can be used insofar as it can move the shaping jig at a constant speed in the direction of a single axis. It is, however, preferred to use such a means that can start and stop the shaping jig at desired positions and can also change its moving speed. For example, a moving system with the shaping jig secured on a 1-axis controlled robot can be used. With the moving system, the moving position and moving speed can be controlled.

To more precisely control the shape of a tape or the position of core parts to be formed into a tape, it is preferred to use a system that can control both of the feed rate of the coating material and the speed of a relative movement of the shaping jig. The use of such a system makes it possible to fabricate an optical fiber tape core different in shape at part or parts thereof or to increase the width and thickness of a tape at position or positions, where strength, protection or the like is needed, by changing the feed rate of the coating material or the speed of a relative movement of the shaping jig in the course of the formation into the tape. To more strictly control the shape of the tape or the position of core parts to be formed into the tape, it is preferred to use such a system that can also control the distance of a relative movement of the shaping jig in addition to the above-described control of the feed rate of the coating material and the speed of the relative movement of the shaping jig.

Further, the shaping jig can be one that allows to change the height of the shaping jig in the course of its movement in the direction of the axis of the optical fibers. Such a shaping jig makes it possible to fabricate an optical fiber tape core different in thickness or the like at part or parts thereof by changing its thickness or shape in the course of fabrication. More preferred is a system that permits automated movements of the shaping jig in the vertical direction.

For the feeding of the coating material, any means can be used. The feeding can be conducted manually, although mechanical or automated feeding is preferred from the viewpoint of control. For example, it is preferred that the initiation and termination of the feeding can be automatically controlled at desired positions. From the standpoint of improving the yield of coating layers made of silicone rubber and controlling the shape such as thickness, it is also preferred to control the feed rate.

Figure 14:
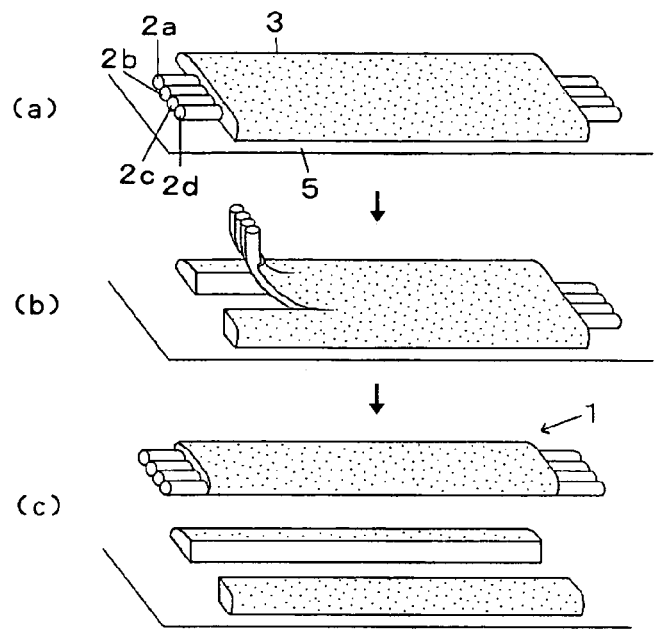
FIG. 14 shows flow diagrams illustrating an example of a fourth embodiment of the process according to the present invention for the fabrication of the optical fiber tape core.

The fourth embodiment of the process of the present invention for the fabrication of an optical fiber tape core will next be described with reference to the drawings. As shown in FIG. 14, the fourth embodiment firstly comprises arranging plural optical fiber cores (four optical fiber cores in the diagrams) in alignment with each other on a substrate 5 having a two-dimensional flat surface and applying a coating material 3 onto the two-dimensional flat surface of the substrate such that these optical fiber cores 2a-2d are coated in a desired range (FIG. 14(*a*)). The plural optical fiber cores are next peeled off from the substrate while holding them at uncoated end portions thereof (FIG. 14(*b*)). At this time, between parts of a coating layer made of silicone rubber, said parts being located on side walls of the outermost optical fiber cores 2a, 2d, and a part of the coating layer, said part being located on the substrate, the coating layer is caused to fracture and separate along the direction of the axes of the optical fiber cores so that a coated optical fiber tape core 1 is formed (FIG. 14(*c*)).

According to the above-described fourth embodiment, it is only necessary to simply mount the optical fiber cores in alignment with each other on the two-dimensional flat surface and to apply the coating material over the optical fiber cores. It is, therefore, unnecessary to subject the optical fiber cores to two-dimensional alignment upon conducting the coating operation. Even if the number of cores is increased, an optical fiber tape core can still be fabricated stably without development of dimensional variations in the direction of the thickness of the optical fiber cores. The range of coating is not limited and, even when coating over a very short distance is desired, it is only necessary to simply apply the coating material to the surfaces of the optical fiber cores. Accordingly, the formation of connector-equipped optical fiber cores into a tape and the fabrication of a short-distance optical fiber tape core can be performed with ease.

In the above-described fourth embodiment, the step in which the two-dimensional flat surface is coated with silicone rubber requires only to apply the silicone rubber such that a silicone rubber coating layer is formed at a constant thickness over the surface of the optical fiber cores, and no limitations whatsoever are imposed on the manner of the coating. For example, plural optical fiber cores arranged on a two-dimensional flat surface of a substrate can be coated with a coating material in advance. A shaping jig with its bottom wall formed into a flat surface can then be moved from a coating start position to a coating end position such that the silicone rubber on the surfaces of the optical fiber cores can be shaped into a uniform thickness by the bottom wall of the shaping jig. This manner makes it possible to apply silicone rubber at a more uniform thickness. The thickness of the silicone rubber can also be controlled to a desired value by adjusting the height of the shaping jig. Further, the coating material can be spread over the two-dimensional flat surface of the substrate with the optical fiber cores arranged thereon by applying the coating material thick over the optical fiber cores beforehand and then moving the shaping jig. In addition, the application of the coating material and the movement of the shaping jig can be interlocked with each other. Furthermore, the coating and the shaping can be conducted at the same time by using a jig that can perform coating and shaping at the same time.

In the step that the plural optical fibers are peeled off from the two-dimensional flat surface, it is only necessary to set the moving speed and moving direction and the angle between the optical fiber cores and the substrate at the time of the peeling such that the peeling can be performed without deforming the shape of the coating layer, and therefore, no particular limitation is imposed on the manner of the peeling. For keeping the shape of the coating layer constant, however, it is preferred to control the moving speed constant during the peeling.

Figure 15:
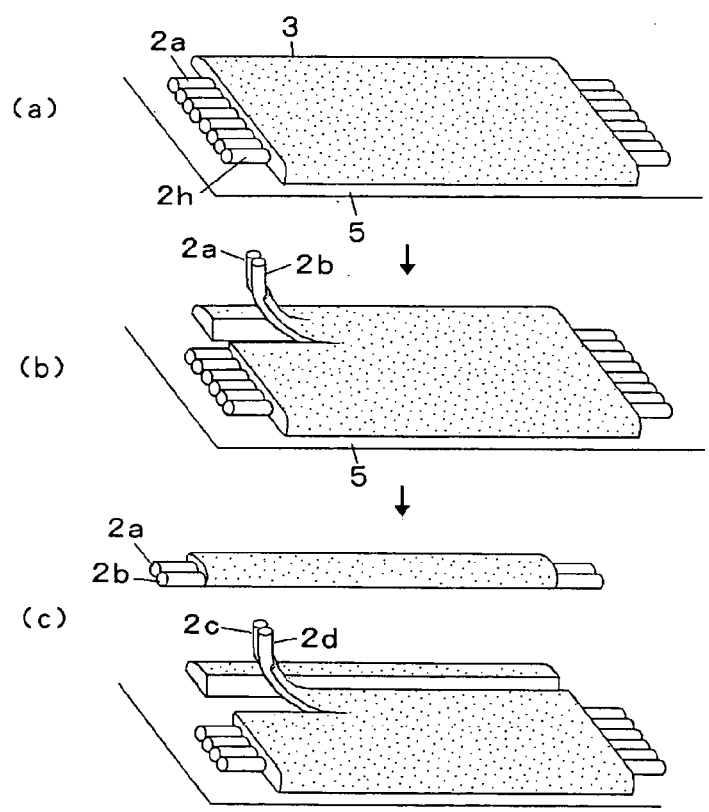
FIG. 15 shows flow diagrams illustrating another example of the fourth embodiment of the process according to the present invention for the fabrication of the optical fiber tape core.

In the fourth embodiment, an optical fiber tape core maybe fabricated by coating the surfaces of plural optical fiber cores with silicone rubber as described above and then peeling some of the optical fiber cores. As illustrated in FIG. 15, for example, a coating material 3 is applied to a two-dimensional flat surface of a substrate 5 with plural optical fiber cores 2a-2h mounted thereon such that the surfaces of the optical fiber cores are coated (FIG. 15(*a*)). Subsequently, some 2a, 2b of the optical fiber cores may then be peeled off from the two-dimensional flat surface to form an optical fiber core 1. The optical fiber cores 2c,2d may then be peeled off to fabricate another optical fiber tape core (FIGS. 15(*b*) and 15(*c*)).

The coated silicone rubber may be cured or dried as needed. This processing can be conducted either before or after peeling the optical fiber cores form the two-dimensional flat surface. These optical fiber cores may also be peeled off while the curing or drying is being conducted. In other words, the curing or drying processing can be conducted in any stage where the alignment of the optical fiber cores is not affected.

Figure 16:
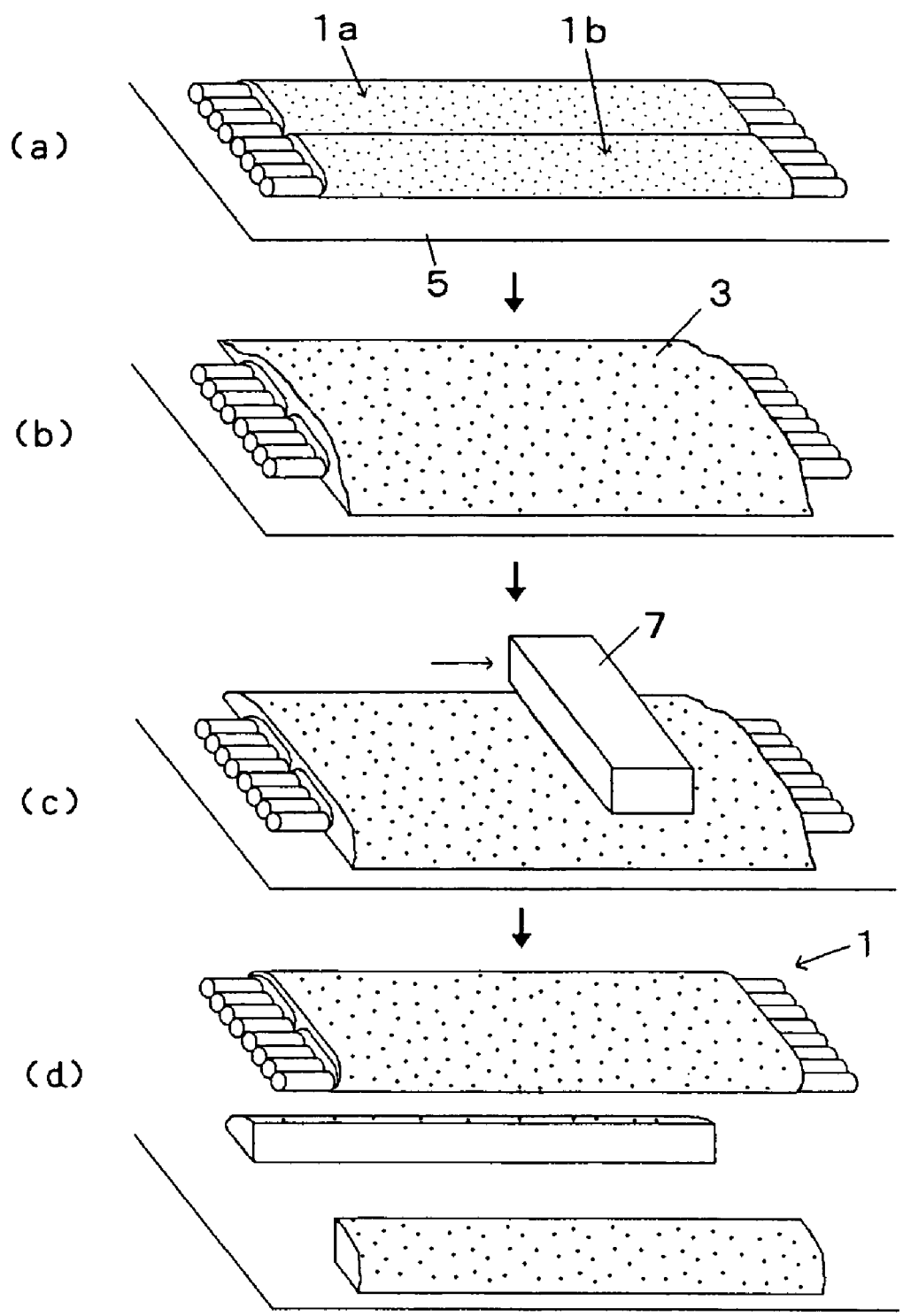
FIG. 16 shows flow diagrams illustrating a further example of the fourth embodiment of the process according to the present invention for the fabrication of the optical fiber tape core.

In the above-described fourth embodiment of the present invention, the coating of the optical fiber tape core may have a multilayer construction. FIG. 16 illustrates the fabrication of an optical fiber tape core having a coating of a two-layer construction. After optical fiber tape cores 1a, 1b fabricated by one of the first to fourth embodiments are arranged on a two-dimensional flat surface (FIG. 16(a)), a coating material 3 is applied over the optical fiber tape cores (FIG. 16(b)). By moving a shaping jig 7 in the direction of an arrow, the coating material on the surfaces of the optical fiber cores is shaped into a uniform thickness (FIG. 16(c)). These optical fiber tape cores are then peeled off from the two-dimensional flat surface. As a result, an optical fiber tape core 1 having a coating layer of a two-layer construction is formed (FIG. 16(d)).

In the above-described first to fourth embodiments of the process of the present invention for the fabrication of an optical fiber tape core, an adhesive layer may be arranged on each two-dimensional flat surface. When optical fiber cores are mounted on the two-dimensional flat surface, they are temporarily held in place by the adhesive layer. The optical fiber cores, therefore, no longer require any positioning for alignment upon conducting coating or shaping so that the setting of the optical fiber cores can be easily conducted in a shorter time. In the fourth embodiment, the existence of the adhesive layer has led to greater adhesive force to the coating material so that the coating layer has been facilitated to fracture and separate along the direction of the axes of the optical fiber cores, thereby making it possible to improve the yield of products. In addition, it has also been facilitated to adjust the pitch intervals of the individual optical fiber cores.

Any adhesive can be used as an adhesive for use in the adhesive layer, insofar as it has adhesive force of such a degree as maintaining the shape of the optical fiber cores, keeping the optical fiber cores free from stress or strain and causing no damage on the optical fiber cores upon peeling them off. Usable examples of the adhesive can include various pressure-sensitive adhesives (adhesives) of the urethane, acrylic, epoxy, nylon, phenol, polyimide, vinyl, silicone, rubber, fluorinated epoxy and fluorinated acrylic types; thermoplastic adhesives, and thermosetting adhesives. From the ease in wiring the optical fire cores, pressure-sensitive adhesives thermoplastic adhesives can be used preferably. Any method can be used to bond the plural optical fiber cores on the adhesive layer. An automated wiring machine capable of bonding the optical fiber cores to the adhesive layer under constant pressure is also usable. A property can be imparted to the adhesive layer such that the adhesive layer is deactivated when the peeling is conducted. The peeling of the optical fiber cores form the adhesive layer can be facilitated, for example, by applying a solvent or irradiating light.

Figure 17:
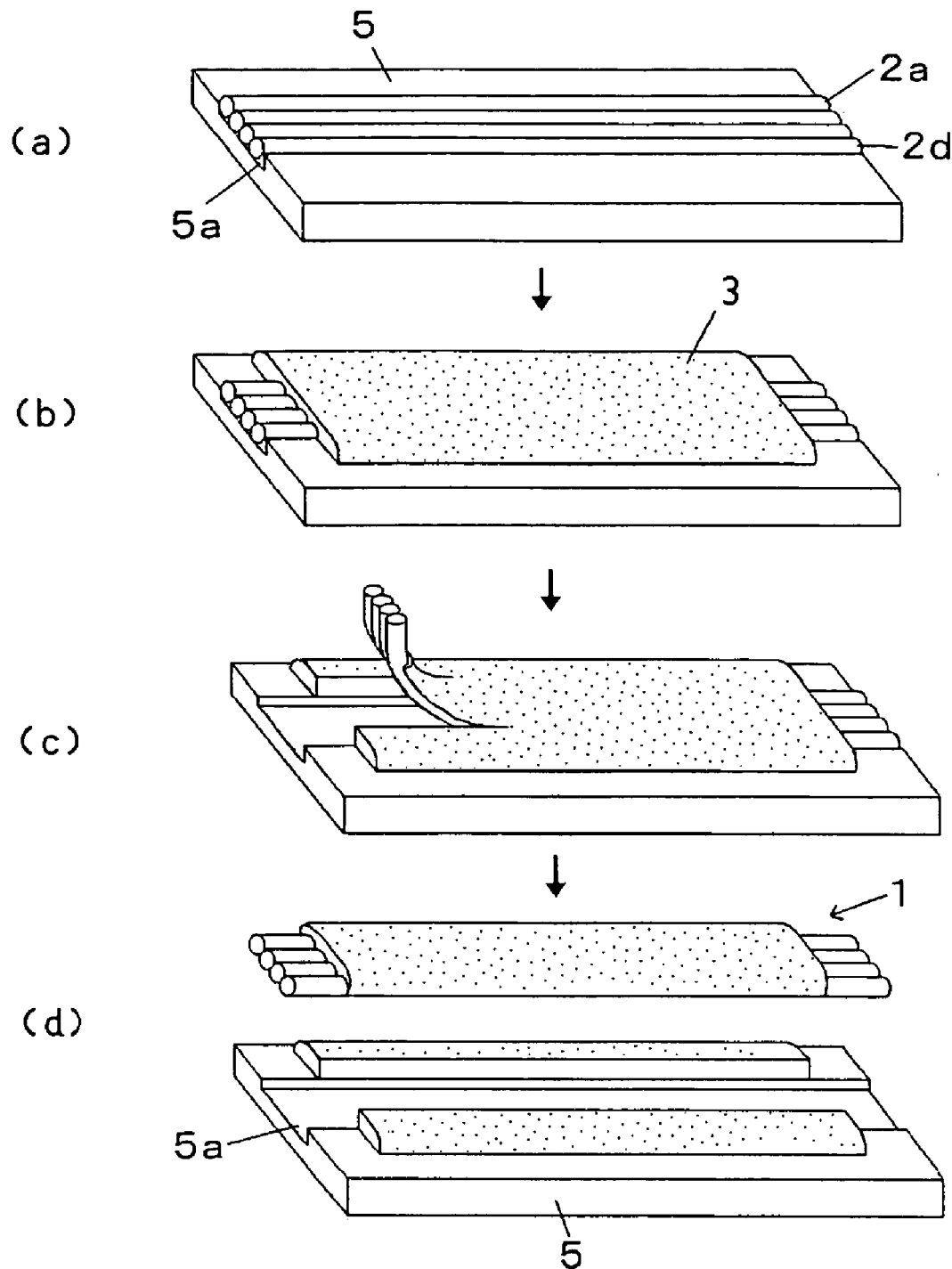
FIG. 17 shows flow diagrams illustrating a still further example of the fourth embodiment of the process according to the present invention for the fabrication of the optical fiber tape core.

In the first to fourth embodiments, the substrate may be provided in the two-dimensional flat surface thereof with a groove for bringing optical fiber cores into alignment with each other. FIG. 17 illustrates a procedure for fabricating an optical fiber tape core by using a groove-provided substrate in the fabrication process according to the fourth embodiment. On a substrate 5 having a two-dimensional flat surface, a groove 5a is arranged to bring optical fiber cores into alignment with each other, and plural optical fiber cores 2a-2d are arranged in the groove (FIG. 17(a)). A coating material 3 is then applied and, if desired, a silicone rubber coating layer is shaped by a similar shaping jig as those described in the above (FIG. 17(b)). Subsequently, the optical fiber cores are peeled off from the substrate (FIG. 17(c)), so that a coated optical fiber tape core 1 is formed (FIG. 17(d)). This procedure makes it possible to regulate lateral movements of the plural optical fiber cores and to align and fix them by simply placing the optical fiber cores in the groove in the two-dimensional flat surface. It is, therefore, possible to more easily coat the plural optical fiber cores without spaces between them in an aligned state and to more readily shape the resulting coating layer.

The groove in the two-dimensional flat surface is required merely to permit aligning optical fiber cores and holding them in place, so that the width and depth of the groove can be dimensioned in conformity with those in the specification of an optical fiber tape core to be fabricated. Further, no particular limitation is imposed on the cross-sectional shape of the groove, and no problem or inconvenience arises with a groove in the form of a V letter or a series of semicircles instead of a rectangular shape.

It is to be noted that the expression "to bring optical fiber cores into alignment" as used herein means to arrange individual optical fiber cores side by side at a desired position. The spaces between the individual optical fiber cores may or may not be equal to each other, and can be set as needed depending upon the specification of an optical fiber tape core of an optical fiber tape core to be fabricated. Concerning the coating of optical fiber cores, no particular limitation is imposed on a range in which the optical fiber cores are to be coated, insofar as the optical fiber cores are coated with silicone rubber at the surfaces of at least parts of the optical fiber cores to be formed into a tape. It is also possible to mount plural bundles of optical fiber cores in parallel with each other and then to coat the bundles of optical fiber cores at the same time. Further, the expression "to peel off optical fiber cores" means that the optical fiber cores and their associated two-dimensional flat surface are caused to separate relative to each other, and the peeling-off of optical fiber cores can be effected by moving either the optical fiber cores or the two-dimensional flat surface. In the present invention, the individual optical fiber cores arranged in alignment with each other on a two-dimensional flat surface are required only that at least parts of them are arranged in alignment with each other on the same flat surface, and may include parts where the optical fiber cores are intersecting. In addition, no particular limitation is imposed on the number of optical fiber cores to be coated all together. It is, therefore, possible to fabricate 2-core tape cores, 4-core tape cores, 6-core tape cores, 8-core tape cores, 16-core tape cores, and so on.

EXAMPLES

The present invention will hereinafter be described more specifically based on examples and comparative examples. It should, however, be bone in mind that the present invention shall by no means limited to the following examples.

Examples 1-6 & Comparative Example 1

Each 8-core optical fiber tape core, which had such a construction as shown in FIG. 2(b) and was provided with a coating layer formed of silicone rubber, was obtained by arranging, as optical fiber cores, eight single-mode optical fibers of 250 μm outer diameter and 125 μm cladding diameter at 250 μm pitches in parallel with each other, applying to one sides of the optical fibers a coating formulation of the corresponding silicone rubber shown in Table 1, and then curing the silicone rubber under the corresponding curing conditions also shown in Table 1. The application of the coating formulation of the silicone rubber was conducted following the procedure of Example 7 to be described subsequently herein.

TABLE 1

| Material No. | Silicone rubber in coating formulation | Company name | Hardness [-] | Tensile strength [kgf/cm$^2$] | Curing conditions |
|---|---|---|---|---|---|
| 1 | "SE9186L" | Dow Corning Toray Silicone | 24 | 15 | Room temperature |
| 2 | "KE106" | Shin-Etsu Silicones | 56 | 80 | 100° C./0.5 h |
| 3 | "KE66" | Shin-Etsu Silicones | 40 | 15 | Room temperature |
| 4 | "SE4410" | Dow Corning Toray Silicone | 85 | 64 | 150° C./0.5 h |
| 5 | "TSE3380" | GE Toshiba Silicones | 70 | 25 | 150° C./0.5 h |
| 6 | "TSE3281-G" | GE Toshiba Silicones | 84 | 45 | 150° C./1 h |

With respect to the thus-obtained optical fiber tape cores, the following tests were then conducted.

(Single-Core Separability Test)

Work was conducted on each optical fiber tape core (500 mm) to separate it into single optical fiber cores, and the ease of the work was ranked.

(Twist Property Test)

Each optical tape core (100 mm) was pulled under tension of 300 gf and, after the optical tape core was twisted 10 times or 20 times at one end thereof, the external appearance of the optical tape core was ranked. Specifically, the optical tape core was observed under a microscope for damages such as cleavage and coating layer peeling.

(Curl Property Test)

Each optical tape core (380 mm) was wound 2 full turns on a bobbin of 60 mm diameter. After the optical tape core was left over for 1 hour, the optical tape core was unwound and then, the degrees of its curling at both ends from a flat table surface were determined.

The test results so obtained are shown in Table 2.

development of curling due to the retention of a wound shape.

In the optical fiber tape core of Comparative Example 1, on the other hand, the single-core separability was good, but the strength was not sufficient and curling had been developed as a result of the winding.

An 8-core optical fiber tape core having the construction shown in FIG. 3(b) was also fabricated and evaluated likewise, and similar results as shown in Table 2 were obtained.

Example 7

Figure 18:
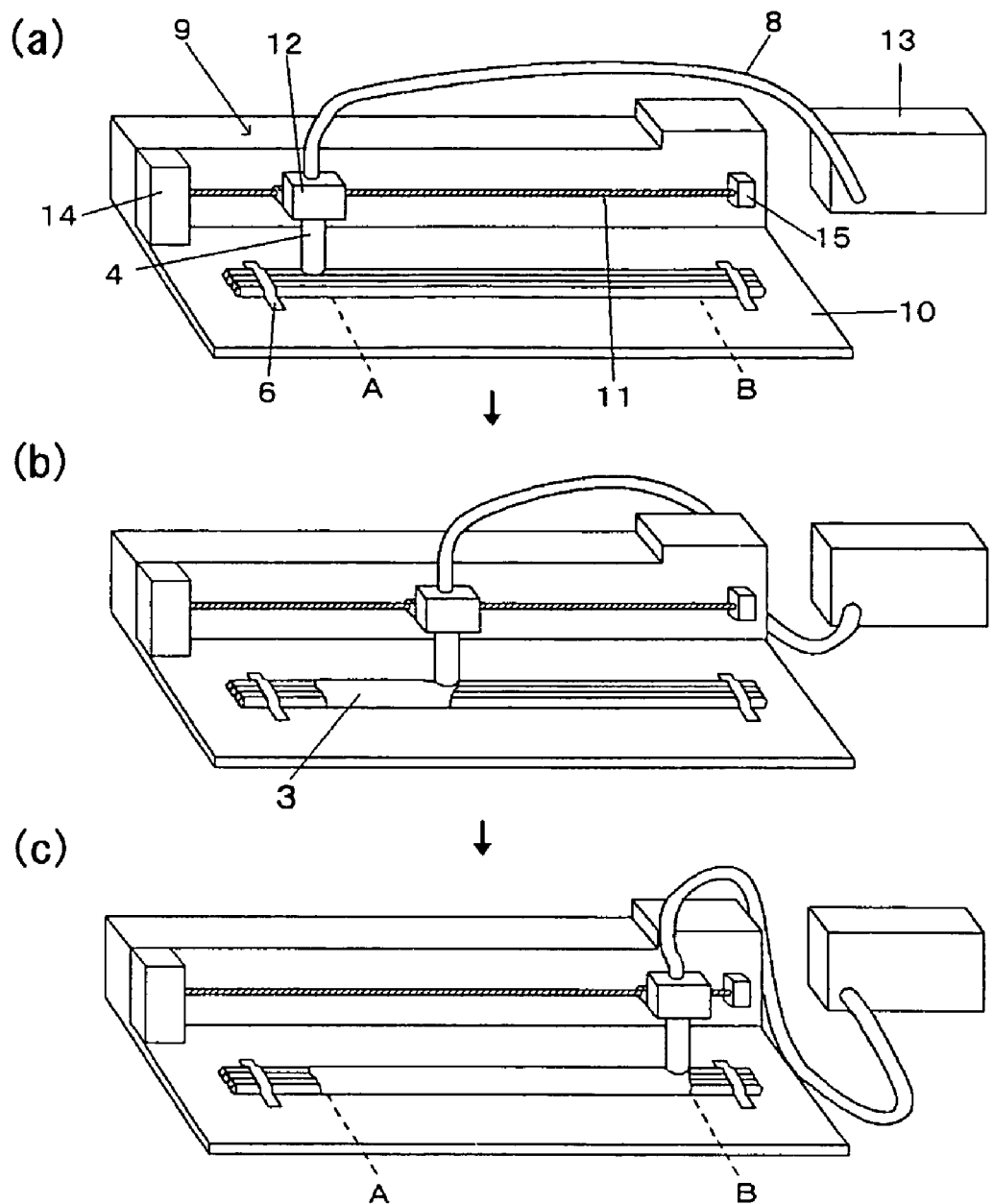
FIG. 18 shows flow diagrams for illustrating the fabrication of an optical fiber tape core in Example 7.

Using four optical fiber cores 2a-2d of 25 cm length (products of The Furukawa Electric Co., Ltd., quartz-based single-mode optical fibers, outer diameter: 0.25 mm), an optical fiber tape core of 20 cm length, 0.4 mm thickness and 1.1 mm width was fabricated by the coating machine shown in FIG. 18.

The used coating machine was constructed of a 1-axis controlled robot and a coating material feeder for feeding a coating material to a nozzle. The 1-axis controlled robot had a flat substrate 10 for mounting optical fibers thereon. A ball screw shaft 11 was arranged along the longitudinal direction, is provided at an end thereof with a drive motor 14, and is supported at an opposite end thereof by a journal bearing 15. A movable unit 12 is arranged in threaded engagement with

TABLE 2

| | Material No. | Single-core separability | Twisting test 10 times | Twisting test 20 times | Curling test [mm] | Evaluation |
|---|---|---|---|---|---|---|
| Example 1 | 1 | Good | No damage | No damage | ≦1 mm | Acceptable |
| Example 2 | 2 | Good | No damage | No damage | ≦1 mm | Acceptable |
| Example 3 | 3 | Good | No damage | No damage | ≦1 mm | Acceptable |
| Example 4 | 4 | Good | No damage | No damage | ≦1 mm | Acceptable |
| Example 5 | 5 | Good | No damage | No damage | ≦1 mm | Acceptable |
| Example 6 | 6 | Good | No damage | No damage | ≦1 mm | Acceptable |
| Comp. Ex. 1 | * | Good | Fractures in coating layer | — | 100 mm | Unacceptable |

* Optical fiber tape core making use of a UV curable resin ("8-CORE TAPE S'08/8T", product of The Furukawa Electric Co., Ltd.)

As shown in Table 2, the optical fiber tape cores of Invention Examples 1-6 showed excellent single-core separability and exhibited sufficient tensile strength, and had been resolved to the maximum extent in the problem of the ball screw, and is provided with a nozzle 4 such that the nozzle extends perpendicularly to the stage surface. On the movable unit, the nozzle was constructed such that it was movable not only in the vertical direction but also in the longitudinal direction and was fixable at a predetermined position. Further, a flexible pipe 8 was connected to the nozzle to feed the coating material from a coating material feeder 13. As the nozzle 4, a dispenser needle made of stainless steel (outer diameter: 1.2 mm, inner diameter: 0.9 mm) was used.

Firstly, the four optical fiber cores were aligned in parallel with each other on the substrate 10 along a line on which the movable unit of the 1-axis controlled robot 9 was movable, and at opposite end parts to which no coating was to be applied, were held in place by adhesive tapes 6 such that the same tension was applied to the individual optical fiber cores. As a coating material, a thermosetting silicone rubber resin having a hardness of 84 and a tensile strength of 45 gf/cm$^2$ ("TSE3281-G", product of GE Toshiba Silicones) was used. As the coating material feeder 13 for feeding the coating material to the nozzle, a dispenser was used.

The movable unit 12 of the 1-axis controlled robot 9 was next controlled to move the nozzle 4 to a coating start position A for the aligned four optical fiber cores (FIG. 18(*a*)). The movable unit 12 of the 1-axis controlled robot 9 was adjusted such that the center of the nozzle was brought into registration with the center of the four optical fiber cores, and the clearance between the optical fiber cores and the free end of the nozzle 4 was set at 0.15 mm.

Next, the moving speed of the movable unit 12 of the 1-axis controlled robot 9 and the delivery pressure of the coating material feeder 13 were set at 50 mm/sec and 5.0 kg/cm$^2$, respectively. Concurrently with the initiation of a movement of the nozzle 4, a delivery of the coating material 3 was initiated. By moving the nozzle 4 in the direction of the axes of the optical fibers, the coating material was applied onto the optical fiber cores (FIG. 18(*b*)). When the nozzle 4 had moved to a coating end position B, the delivery of the coating material was stopped (FIG. 18(*c*)). Subsequently, the optical fiber tape core was treated under the conditions of 150° C. for 1 hour to effect the curing of the coating material.

By coating and curing the coating material through the above operation, it was possible to apply the coating over the surfaces of the plural optical fibers all together. The thus-obtained optical fiber tape core was good in single-core separability, was not peeled off when twisted 10 times, and did not develop curling.

According to the above procedure, it was possible to fabricate optical fiber tape cores of 1.1 mm and less in width and 0.4 mm and less in thickness without developing any problem. Since it was possible to deliver the coating material only as much as needed to coat by moving the nozzle while delivering the coating material under constant pressure, the yield was good so that the cost of the coating material was successfully reduced.

Example 8

An optical fiber tape core was fabricated in a similar manner as in Example 7 except that the moving speed was changed to 35 mm/sec in a range of 10 cm at central parts of the optical fibers. In the resulting optical fiber tape core, the width and thickness of its central part were 1.2 mm and 0.55 mm, respectively, and were greater than those of the remaining parts (width: 1 mm, thickness: 0.4 mm). The optical fiber tape core was good in single-core separability, was not peeled off when twisted 10 times, and did not develop curling. The optical fiber tape core was provided with increased strength, did not undergo breakage even when bent severely, and therefore, had sufficient strength.

Example 9

Provided were four optical fiber cores of 25 cm length with MU connectors attached to one ends thereof. The four optical fiber cores with the MU connectors attached to the one ends thereof were formed at their central parts of 15 cm into a tape in a similar manner as in Example 7.

According to the above procedure, the optical fiber tape core was successfully fabricated at the predetermined position of the optical fiber cores with the MU connectors attached to the one ends thereof. By the formation into the tape, the optical fibers were united together and were increased in strength. The optical fibers, therefore, showed better handling ease in a system, leading to an improvement in workability.

Example 10

To fabricate an optical fiber tape core of 60 cm length, 1.1 mm width and 0.4 mm thickness by using four optical fiber cores of 80 cm length (products of The Furukawa Electric Co., Ltd., quartz-based single-mode optical fibers, outer diameter: 0.25 mm), the procedure shown in the flow diagrams of FIG. 9 were practiced. It is, however, to be noted that movements of a shaping jig were conducted manually. Employed as the shaping jig was one having a size of 40 mm in width (L), 30 mm in length (S) and 40 mm in height (H) and provided at a laterally central part thereof with a shaping groove having a size of 1.1 mm in width (W) and 0.4 mm in height (h). As a coating material, a thermosetting silicone rubber resin having a hardness of 84 and a tensile strength of 45 kgf/cm$^2$ ("TSE3281-G", product of GE Toshiba Silicones Co., Ltd.) was used.

Firstly, the four optical fiber cores 2*a*-2*d* were aligned in parallel with each other on the substrate 5 in the optical fiber tape core fabrication facilities, and at their opposite end portions to which no coating was to be applied, were held in place by adhesive tapes 6. The coating material was then applied to the surfaces of the four optical fiber cores over a range of 60 cm where the optical fiber cores were to be formed into a tape, and the surface of the coating material was lightly leveled by a spatula (FIG. 9(*a*)).

Next, the shaping jig 7 was placed on the substrate such that the four optical fiber cores were located in the shaping grove 7*a* of the shaping jig (FIG. 9(*b*)). The shaping jig was then moved in the direction of the axes of the optical fibers from the coating start position A to the coating end position B (FIG. 9(*c*) and FIG. 9(*d*)). Subsequently, the thus-shaped coating material was cured under the conditions of 150° C. and 1 hour to fabricate a 4-core optical fiber tape core. The thus-obtained optical fiber tape core was good in single-core separability, was not peeled off when twisted 10 times, and did not develop curling.

In this example, the setting of the optical fiber cores required merely to bring the optical fiber cores, which had been mounted on the substrate, into the shaping groove of the shaping jig. Accordingly, the time required for the work was short and the operations were simple, resulting in improved working efficiency. Further, the thus-obtained optical fiber tape core was 1.2 mm in tape width and 0.35 mm in thickness, that is, was substantially of the preset dimensions, and the tape shape was substantially semielliptic in cross-section as desired.

Example 11

Figure 19:
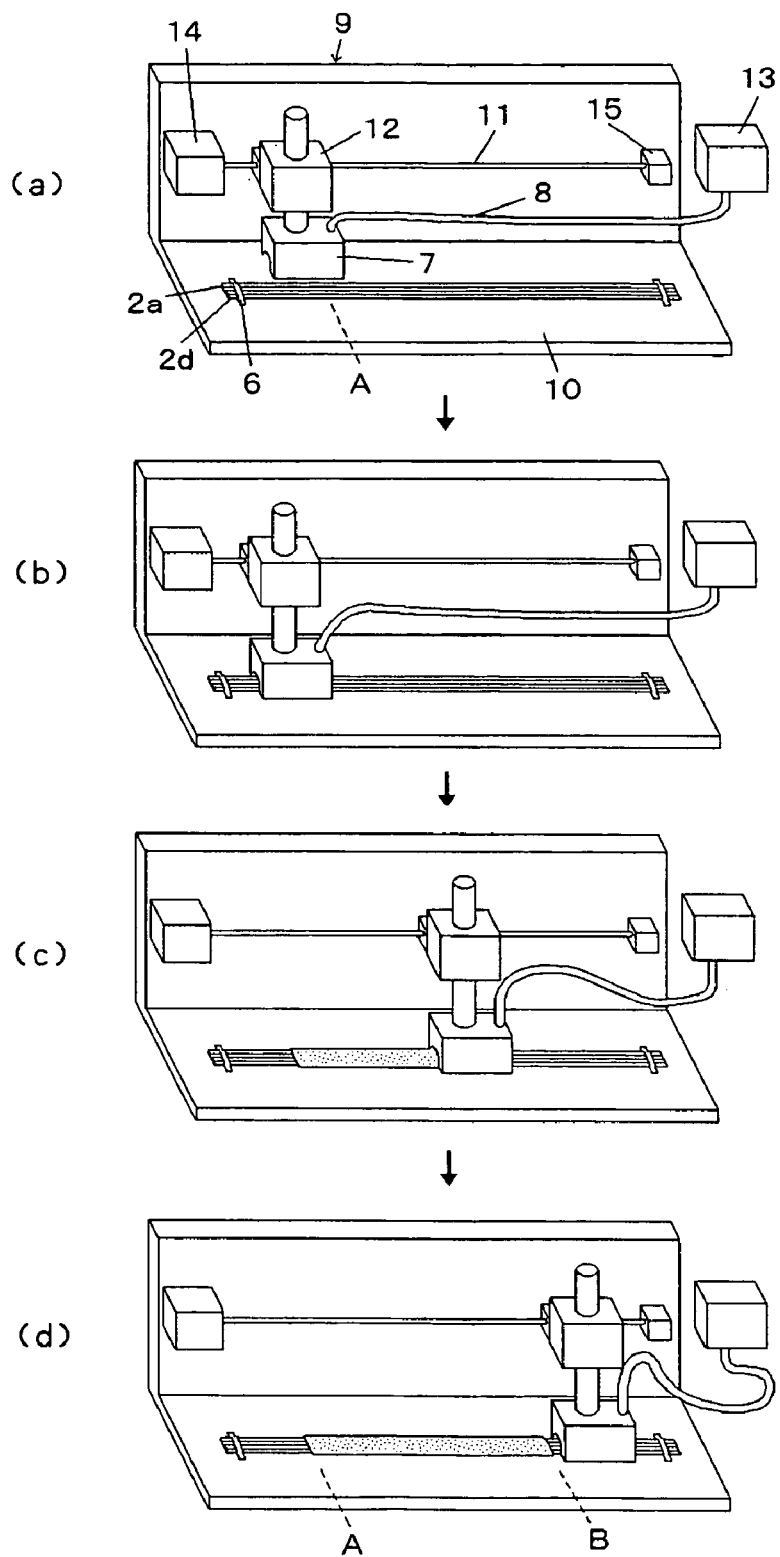
FIG. 19 shows flow diagrams for illustrating the fabrication of an optical fiber tape core in Example 11.

Using four optical fiber cores of 90 cm length (products of The Furukawa Electric Co., Ltd., quartz-based single-mode optical fibers, outer diameter: 0.25 mm), an optical fiber tape core of 70 cm length, 1.1 mm width and 0.4 mm thickness was fabricated by the fabrication steps shown in FIG. 19. A coating machine employed in the fabrication was of the construction illustrated in FIG. 19. Described specifically, the coating machine was constructed of a flat substrate 10 for mounting the optical fiber cores thereon, said flat substrate being provided with a side, a 1-axis controlled robot 9 having a ball screw shaft 11 provided at one end thereof with a drive motor 14 and at an opposite end thereof with a journal bearing 15, and a coating material feeder 13 capable of controlling the feed rate of a coating material. The drive motor and journal bearing are fixedly secured on the side wall, and a shaping jig 7 was arranged on a movable unit 12, which was maintained in threaded engagement with the ball screw shaft 11, such that the shaping jig was movable in a vertical direction relative to the substrate. Accordingly, the shaping jig was movable in the vertical and longitudinal directions by the movable unit 12. In this example, a dispenser was used as the coating material feeder 13, and as the coating material, a thermosetting silicone rubber resin having a hardness of 84 and a tensile strength of 45 kgf/cm$^2$ ("TSE3281-G", product of GE Toshiba Silicones Co., Ltd.) was used.

A shaping jig employed in this example had the same size as that used in Example 10, but at its free end part (on the forward side as viewed in the moving direction of the shaping jig), was provided with a circular through-hole having a diameter of 2 mm and extending to a shaping groove. A flexible pipe 8 is connected to the through-hole such that the coating material can be fed from the coating material feeder 13.

Firstly, the four optical fiber cores 2a-2d were aligned in parallel with each other on the flat substrate 10, and at their opposite end portions to which no coating was to be applied, were held in place by adhesive tapes 6. Next, the movable unit 12 was moved such that the through-hole of the shaping jig 7 was located at the coating start position A (FIG. 19(a)). The shaping jig 7 was then lowered such that the four optical fibers are located in the shaping groove of the shaping jig (FIG. 19(b)). While feeding the coating material, the shaping jig was moved at a speed of 50 mm/sec in the direction of the axes of the optical fiber cores (FIG. 19(c)). When the through-hole of the shaping jig had reached the coating end position B, the feeding of the coating material was terminated and further, the shaping jig was moved to complete the coating and shaping work (FIG. 19(d)). Subsequently, the thus-shaped coating material was cured under the conditions of 150° C. and 1 hour to fabricate a 4-core optical fiber tape core. The thus-obtained optical fiber tape core was good in single-core separability, was not peeled off when twisted 10 times, and did not develop curling.

In this example, the setting of the optical fiber cores required merely to bring the optical fiber cores, which had mounted on the substrate, into the shaping groove of the shaping jig. Accordingly, the time required for the work was short and the operations were simple, resulting in improved working efficiency. By providing the shaping jig with the shaping groove and the through-hole and feeding the coating material, it was possible to perform both the coating and the shaping at the same time by the shaping jig of the very simple construction. Moreover, the feed rate of the coating material was controllable so that the coating material was not fed excessively, leading to an improvement in material yield. In addition, it was possible to coat, that is, to form a tape only at a predetermined position. Therefore, the thus-obtained optical fiber tape core was 1.1 mm in tape width and 0.4 mm in thickness, that is, was substantially of the preset dimensions, and the tape shape was substantially semielliptic in cross-section as desired.

Example 12

Figure 20:
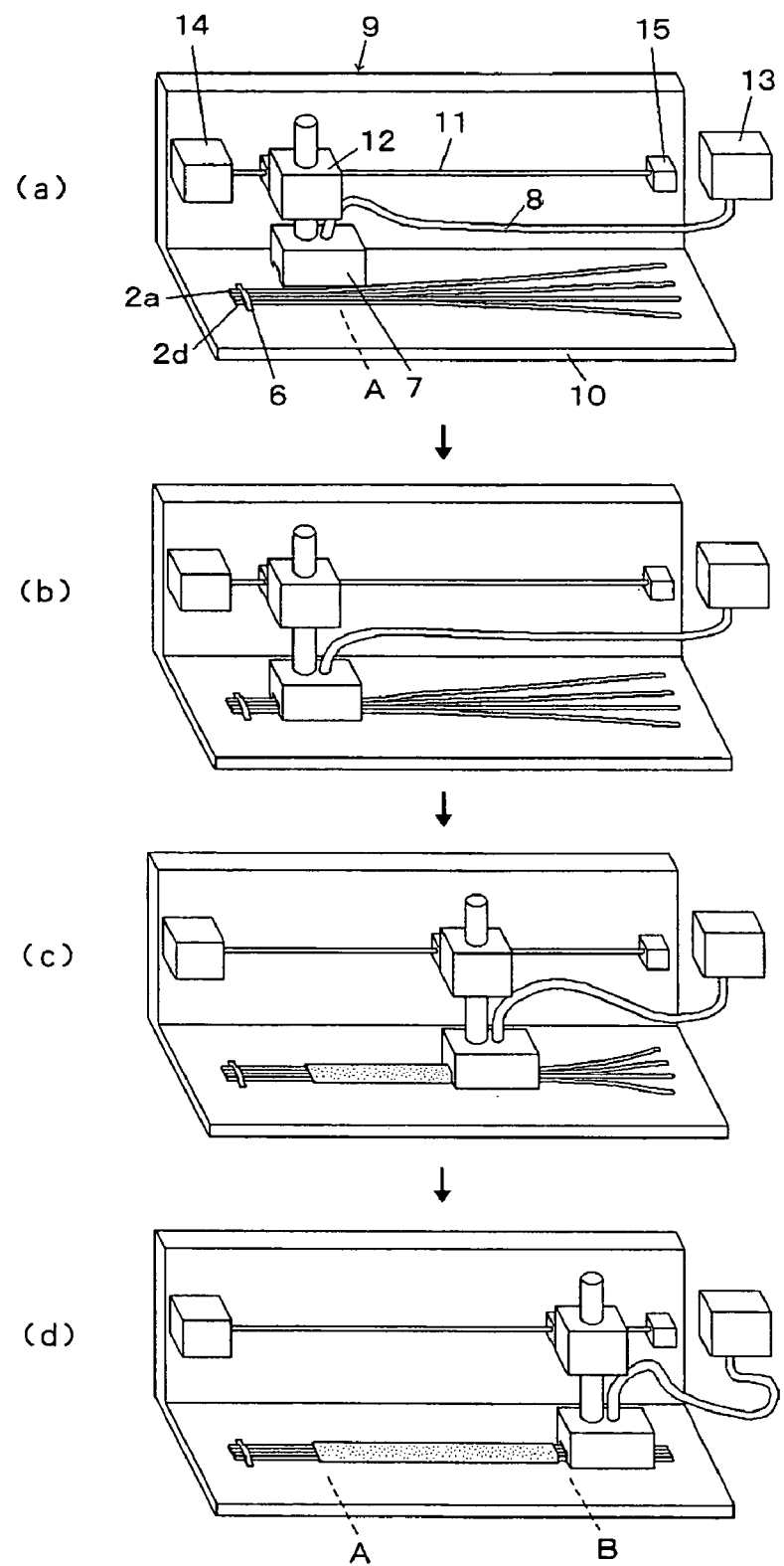
FIG. 20 shows flow diagrams for illustrating the fabrication of an optical fiber tape core in Example 12.

Using four optical fiber cores of 35 cm length (products of The Furukawa Electric Co., Ltd., quartz-based single-mode optical fibers, outer diameter: 0.25 mm), an optical fiber tape core of 25 cm length, 1.1 mm width and 0.4 mm thickness was fabricated by the fabrication steps shown in FIG. 20. A coating machine employed in the fabrication was the same as that used in Example 11, but as the shaping jig 7, was used one provided at a laterally central part thereof with a rectangular shaping groove of 1.1 mm width and 0.4 mm height and at a longitudinally central part of the shaping groove with a through-hole of 2 mm diameter. Except for the shaping jig, the 4-core optical fiber tape core was fabricated in a similar manner as in Example 11.

In this example, the setting of the optical fiber cores required merely to bring the optical fiber cores, which had mounted on the flat substrate, into the shaping groove of the shaping jig. Accordingly, the time required for the work was short and the operations were simple, resulting in improved working efficiency. By arranging the through hole at the longitudinal center of the shaping groove formed in the shaping jig and feeding a coating material, it was possible to perform both the coating and the shaping at the same time by the shaping jig of the very simple construction while aligning the optical fibers. As it was unnecessary to align the optical fibers together and in parallel with each other, a further improvement was achieved in working efficiency with respect to the setting of the optical fibers. Moreover, the feed rate of the coating material was controllable so that the coating material was not fed excessively, leading to an improvement in material yield. In addition, it was possible to coat, that is, to form a tape only at a predetermined position. Therefore, the thus-obtained optical fiber tape core was 1.1 mm in tape width and 0.4 mm in thickness, that is, was substantially of the preset dimensions, and the tape shape was substantially rectangular in cross-section as desired. The thus-obtained optical fiber tape core was good in single-core separability, was not peeled off when twisted 10 times, and did not develop curling.

Example 13

Figure 21:
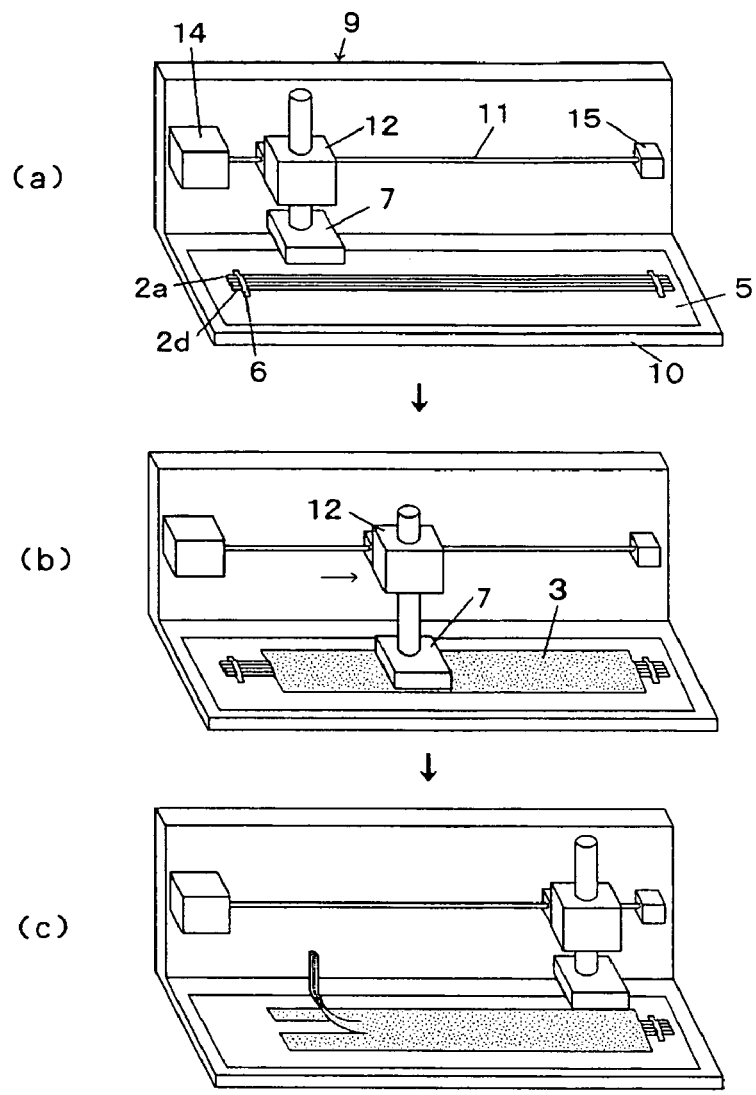
FIG. 21 shows flow diagrams for illustrating the fabrication of an optical fiber tape core in Example 13.
Figure 22:
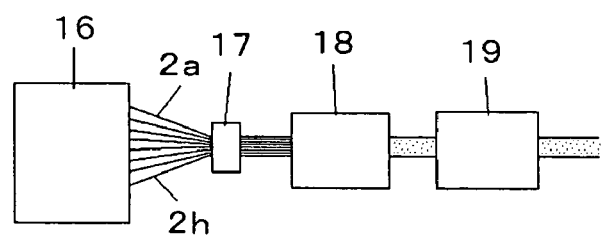
FIG. 22 is a flow diagram for illustrating the conventional fabrication of an optical fiber tape core.
Figure 23:
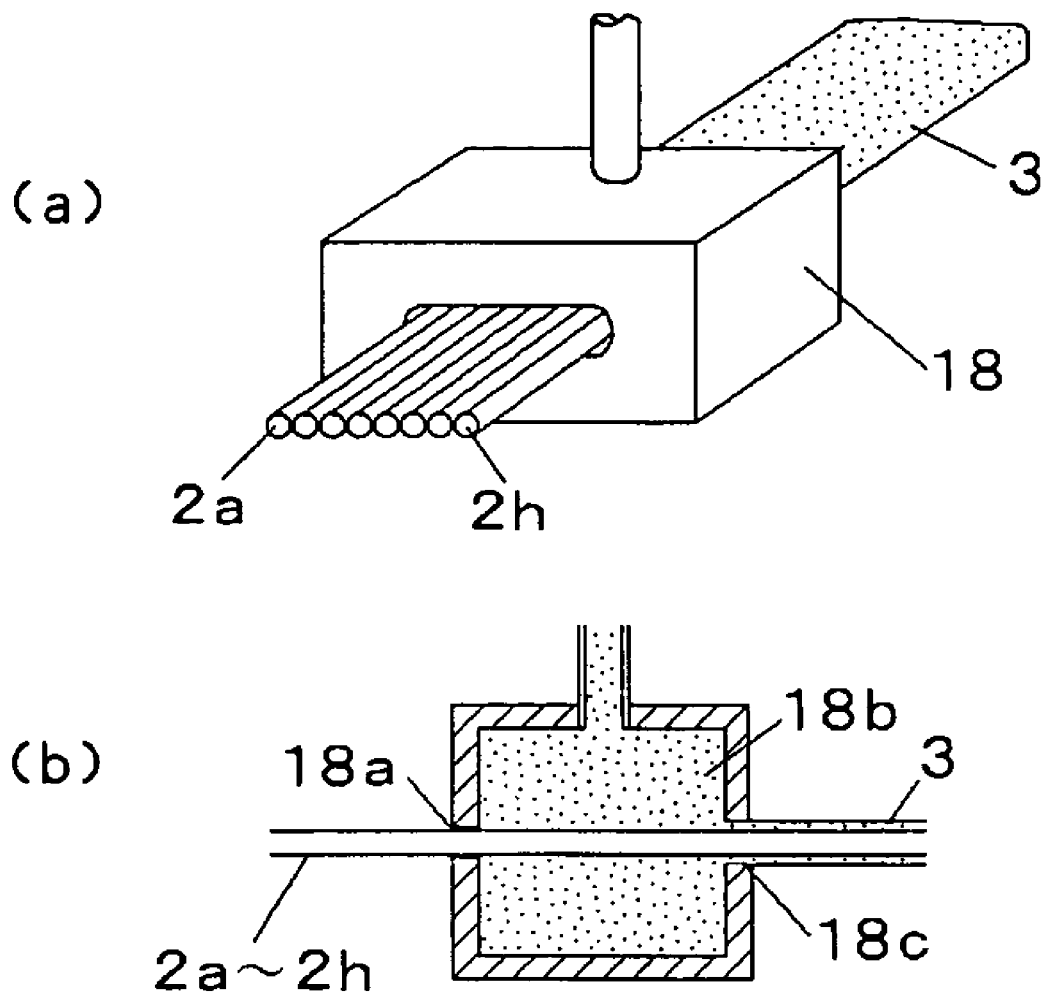
FIG. 23 shows a perspective view (a) and cross-sectional view (b) of a conventional coating (shaping) jig.

Using four optical fiber cores of 40 cm length (products of The Furukawa Electric Co., Ltd., quartz-based single-mode optical fibers, outer diameter: 0.25 mm), an optical fiber tape core of 30 cm length was fabricated. A coating machine employed in this example was of the construction illustrated in FIG. 21. Described specifically, the coating machine was constructed of a flat base 10 with a substrate 5 arranged thereon to permit mounting the optical fiber cores, and a 1-axis controlled robot 9 having a ball screw shaft 11 provided at one end thereof with a drive motor 14 and at an opposite end thereof with a journal bearing 15. A shaping jig 7 had a size of 40 mm width, 30 mm length and 40 mm height, had a flat surface at the bottom wall thereof, and was arranged in a direction vertical to the substrate on a movable unit 12 mounted on a ball screw shaft 11. Accordingly, the movable unit 12 was able to move the shaping jig in the vertical and longitudinal directions. It is to be noted that coating of a coating material and movements of relative to the substrate for the optical fiber cores were conducted manually. As the coating material, a room-temperature curable silicone rubber having a hardness of 24 and a tensile strength of 15 kgf/cm$^2$ ("SE9186L", product of Dow Corning Toray Silicone Co., Ltd.) was used.

Firstly, the four optical fiber cores 2a-2d were aligned in parallel with each other on the substrate 5, and at their opposite end portions to which no coating was to be applied, were held in place by adhesive tapes 6, so that they were arranged above the flat base 10 (FIG. 21(a)). Next, the coating material 3 was applied to the surfaces of the four optical fiber cores in a range of 30 cm where the optical fiber cores were to be formed into a tape. The movable unit 12 was then moved such that the bottom wall of the shaping jig 7 was located at a height of 0.1 mm from the surfaces of the four optical fiber cores, and was moved at a moving speed of 50 mm/sec in the direction of the axes of the optical fiber cores (an arrow mark) (FIG. 21(b)). The thus-shaped coating material was then semi-cured under the conditions of room temperature and a curing time of 30 minutes. Next, the optical fiber cores were held at one ends thereof by a hand and then pulled in an upper direction, so that the optical fiber cores were peeled off from the substrate (FIG. 21(c)). The thus-obtained optical fiber tape core was treated further under the conditions of room temperature and 1 hour to completely cure the coating material, so that the 4-core optical fiber tape core was obtained. The thus-obtained optical fiber tape core was good in single-core separability, was not peeled off when twisted 10 times, and did not develop curling.

The above-described procedure allowed to perform the shaping of the optical fiber tape cores very easily, and therefore, was able to make the fabrication time shorter than the conventional fabrication processes. Further, it was unnecessary to conduct any two-dimensional alignment adjustment. Therefore, optical fiber tape cores were fabricated without wasting, and the yields of the optical fiber cores and coating material were good. Moreover, the thus-obtained optical fiber tape cores had a uniform thickness of 0.35 mm.

Example 14

A 30-cm long, 8-core optical fiber tape core of a unitary 2-layer construction was fabricated by using two of the optical fiber tape cores fabricated in Example 13, arranging the optical fiber tape cores side by side in parallel with each other, coating the optical fiber tape cores together with a thermosetting silicone rubber having a hardness of 84 and a tensile strength of 45 kgf/cm$^2$ ("TSE3281-G", product of GE Toshiba Silicones Co., Ltd.). As a shaping machine and forming jig, the same machine and jig as those employed in Example 13.

Firstly, two optical fiber tape cores obtained in a similar manner as in Example 13 were arranged in parallel with each other on a substrate. Next, the coating material was applied to the surfaces of the two optical fiber tape cores. A movable unit was then moved such that a bottom wall of a shaping jig was located at a height of 0.05 mm from the surfaces of the two optical fiber tape cores, and was moved at a moving speed of 50 mm/sec in the direction of the axes of the optical fiber cores. The thus-shaped coating material was then semi-cured under the conditions of a curing temperature of 150° C. and a curing time of 30 minutes. Next, the optical fiber cores were held at one ends thereof by a hand and then pulled in an upper direction, so that the optical fiber cores were peeled off from the substrate. The thus-obtained, 8-core optical fiber tape core was treated further under the conditions of 150° C. and 1 hour to completely cure the coating material, so that the 8-core optical fiber tape core of the two-layer construction was obtained. The thus-obtained optical fiber tape core was good in single-core separability, was not peeled off when twisted 10 times, and did not develop curling.

In the above-described example, the optical fiber tape core of the two-layer construction was successfully fabricated the same facilities and procedure as in Example 13. Unlike the conventional processes, it was unnecessary to replace the jig for use in the fabrication. The fabrication was, therefore, possible with good working efficiency and at low cost. The thus-obtained optical fiber tape core had a uniform thickness of 0.4 mm.

Example 15

Using four optical fiber cores of 40 cm length, an optical fiber tape core was fabricated in a similar manner as in Example 13 except for the use of a substrate equipped with a groove which was 0.1 mm in depth and 1.1 mm in width and had a rectangular shape in cross-section. As the alignment of the optical fiber cores was successfully achieved by simply mounting the optical fiber cores in the groove, the setting of the optical fiber cores was feasible without any precise positional alignment. Accordingly, it was possible to shorten the time required for the work. It was also possible to conduct the work with ease, resulting in improved working efficiency.

Example 16

Using four optical fiber cores of 40 cm length provided at opposite ends thereof with MT connectors, an MT-connector-equipped, 4-core optical fiber tape core was fabricated by forming them into a tape at their central parts of 35 cm length. As a substrate having a two-dimensional flat surface, a polyimide film of 500 mm×100 mm in size and 125 μm in thickness was used, and on one side of the substrate, an adhesive layer of 100 μm in film thickness was formed. The four optical fiber cores were bonded on the adhesive layer of the substrate such that they were held in place in alignment with each other. Subsequently, the procedure of Example 13 was followed likewise to fabricate the 4-core optical fiber tape core.

In this example, the optical fiber cores provided at the opposite ends thereof with the MT connectors was arranged and temporarily held in place beforehand on the adhesive layer. It was, therefore, possible to conduct the application and shaping of the coating material easily and uniformly. It was also possible to conduct with ease the positional alignment of the shaping jig. Accordingly, it was possible to shorten the time required for the work, resulting in improved working efficiency. Using the MT-connector-equipped optical fiber tape core, its connection to optical components in a system was performed. As the optical fiber tape core had been formed into the tape at the central part thereof, it was possible to easily handle its optical fiber cores and to readily connect them to the optical components, resulting in improved working efficiency.

INDUSTRIAL APPLICABILITY

The optical fiber tape core according to the present invention has extremely good characteristics that it is equipped with both sufficiently high strength and flexibility and hardly develops curling. Upon attachment of connectors or during installation work, its optical fiber cores neither break nor develop curling, thereby bringing above improvements in reliability, work safety and work efficiency. According to the fabrication process of the present invention for the optical fiber tape core, plural optical fiber cores can be readily formed into the tape by coating them together at a desired position and shaping the resulting coating layer with a nozzle and forming jig of simple constructions.

The invention claimed is:

1. A process for fabricating an optical fiber tape core by coating plural optical fiber cores all together, wherein the optical fiber core comprises an optical fiber core assembly with plural optical fiber cores two-dimensionally arranged in parallel with each other, and a coating layer formed of silicone rubber and arranged on one side of said optical fiber core assembly, said silicone rubber forming said coating layer; and said plural optical fiber cores do not intersect each other at any location along said plural optical fiber cores, the process comprising the steps of:

mounting said optical fiber cores in alignment with each other on a two-dimensional flat surface such that said optical fiber cores do not intersect each other at any location along said plural optical fiber cores;

applying silicone rubber onto said two-dimensional flat surface such that said two-dimensional flat surface with said plural optical fiber cores mounted therein is coated with said silicone rubber to form a coating layer; and peeling off said plural optical fiber cores from said two-dimensional flat surface to separate, from said coating layer on said two-dimensional flat surface, only a part thereof located on the peeled optical fiber cores.

2. The process according to claim 1, wherein only some of said coated, plural optical fiber cores are peeled off from said two-dimensional flat surface.

3. The process according to claim 1, wherein a coating layer formed of silicone rubber having a hardness of from 20 to 90 and a tensile strength of from 15 to 80 kgf/cm2 is formed.

4. The process according to claim 1, wherein said two-dimensional flat surface is provided with an adhesive layer for temporarily holding said optical fibers in place on said two-dimensional flat surface.

5. The process according to claim 1, wherein said two-dimensional flat surface is provided with a groove for aligning said optical fiber cores on said two-dimensional flat surface.

* * * * *